US012809296B2

(12) United States Patent
Nakao et al.

(10) Patent No.: US 12,809,296 B2
(45) Date of Patent: Nov. 24, 2026

(54) IMAGE FORMING SYSTEM, IMAGE FORMING APPARATUS, AND SERVER APPARATUS

(71) Applicant: CANON KABUSHIKI KAISHA, Tokyo (JP)

(72) Inventors: Kenichi Nakao, Shizuoka (JP); Masaki Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/051,121

(22) Filed: Feb. 11, 2025

(65) Prior Publication Data

US 2025/0271803 A1 Aug. 28, 2025

(30) Foreign Application Priority Data

Feb. 22, 2024 (JP) ................................ 2024-026048

(51) Int. Cl.
*G03G 15/00* (2006.01)
*H04N 1/00* (2006.01)

(52) U.S. Cl.
CPC ..... *G03G 15/5079* (2013.01); *G03G 15/5062* (2013.01); *H04N 1/00039* (2013.01); *H04N 1/00079* (2013.01); *H04N 1/00244* (2013.01); *H04N 1/00973* (2013.01)

(58) Field of Classification Search
CPC .......... G03G 15/5079; G03G 15/5062; H04N 1/00039; H04N 1/00079; H04N 1/00244; H04N 1/00973
See application file for complete search history.

(56) References Cited

U.S. PATENT DOCUMENTS

2015/0277813 A1* 10/2015 Nagatomo ............. G06F 3/122 358/1.15

FOREIGN PATENT DOCUMENTS

| | | |
|---|---|---|
| JP | 2015187788 A | 10/2015 |
| JP | 2019177525 A | 10/2019 |
| JP | 2020154814 A | 9/2020 |
| JP | 2021071657 A | 5/2021 |

* cited by examiner

*Primary Examiner* — Sandra Brase
(74) *Attorney, Agent, or Firm* — Venable LLP

(57) ABSTRACT

An image forming system includes an image forming apparatus and a server apparatus capable of communicating with the image forming apparatus. The image forming apparatus includes a collecting unit for collecting operation history data relating to an operation history of the image forming apparatus on the basis of a collection data setting which is a setting relating to collection of data and for transmitting the collected operation history data to the server apparatus. The server apparatus includes an analyzing unit for analyzing the operation history data and a collection data setting unit for providing notification to the image forming apparatus so that the collection data setting is changed on the basis of an analysis result of the analyzing unit.

19 Claims, 12 Drawing Sheets

<table>
<tr><td colspan="2"></td><td>☐ PLAN A</td><td>☑ PLAN B</td><td>☐ PLAN C</td><td>☐ PLAN D</td><td>☐ PLAN E</td></tr>
<tr><td>BASIC DATA ANALYZING PORTION ANALYSIS RESULT</td><td>EXTENSION DATA ANALYZING PORTION ANALYSIS RESULT</td><td></td><td></td><td colspan="3">COLLECTION LEVEL SETTING</td></tr>
<tr><td rowspan="2">UNCLEAR/ GOOD/ NORMAL</td><td>UNCLEAR/ GOOD/ NORMAL</td><td>LEVEL 1</td><td>LEVEL 1</td><td>LEVEL 1</td><td>LEVEL 2</td><td>LEVEL 3</td></tr>
<tr><td>ATTENTION</td><td rowspan="2">LEVEL 1</td><td rowspan="2">LEVEL 1</td><td rowspan="2">LEVEL 2</td><td rowspan="2">LEVEL 2</td><td rowspan="2">LEVEL 3</td></tr>
<tr><td rowspan="2">ATTENTION</td><td>UNCLEAR/ GOOD/ NORMAL</td></tr>
<tr><td>ATTENTION</td><td>LEVEL 1</td><td>LEVEL 2</td><td>LEVEL 3</td><td>LEVEL 3</td><td>LEVEL 3</td></tr>
</table>

FIG. 8

IMAGE FORMING SYSTEM, IMAGE FORMING APPARATUS, AND SERVER APPARATUS

FIELD OF THE INVENTION AND RELATED ART

The present invention relates to an image forming system in which data relating to an operation history of an image forming apparatus such as a copying machine, a printer, a facsimile apparatus, or a multi-function machine having a plurality of functions of functions of these machines (apparatuses), and relates to the image forming apparatus and a server apparatus.

Conventionally, for the image forming apparatus such as the copying machine or the printer, a system in which the change history thereof is analyzed on a server and necessity of preventive maintenance and emergency member is notified to a user or a dealer is proposed.

In Japanese Laid-Open Patent Application No. 2021-71657, the following mechanism is proposed. An operation history of an image forming apparatus is analyzed an analyzing program mounted on a server, and an exchange timing of a sheet (paper) feeding roller, a fixing device, or the like is notified to the user or the dealer. Then, validity of a maintenance content is discriminated, so that accuracy of the analyzing program is improved.

SUMMARY OF THE INVENTION

The system as described above takes, in general, the form such that predetermined data are collected from the image forming apparatus and are analyzed by a cloud service. In the cloud service, in general, a pay-as-you-go billing system depending on a server resource (storage, memory, execution time) is employed.

For that reason, it is important that the above-described system is a system capable of suppressing an operation cost while maintaining analysis accuracy.

A conventional system is designed so that predetermined data collected from the image forming apparatus become necessary minimum data for maintaining predetermined analysis accuracy. However, a mechanism capable of flexibly coping with a change in required analysis accuracy depending on an operation history of the image forming apparatus is required.

Therefore, a principal object of the present invention is to provide an image forming system, an image forming apparatus, and a server apparatus, which are capable of efficiently acquiring appropriate analysis accuracy depending on the operation history of the image forming apparatus, or the like.

The above-described object has been accomplished by the image forming system, the image forming apparatus, and the server apparatus according to the present invention.

According to an aspect of the present invention, there is provided an image forming system comprising: an image forming apparatus; and a server apparatus capable of communicating with the image forming apparatus, wherein the image forming apparatus includes a collecting unit configured to collect operation history data relating to an operation history of the image forming apparatus on the basis of a collection data setting which is a setting relating to collection of data and configured to transmit the collected operation history data to the server apparatus, and wherein the server apparatus includes an analyzing unit configured to analyze the operation history data and a collection data setting unit configured to provide notification to the image forming apparatus so that the collection data setting is changed on the basis of an analysis result of the analyzing unit.

According to another aspect of the present invention, there is provided an image forming apparatus capable of communicating with a server apparatus, comprising: a collecting unit configured to collect operation history data relating to an operation history of the image forming apparatus on the basis of a collection data setting which is a setting relating to collection of data and configured to transmit the collected operation history data to the server apparatus, wherein the collection data setting is changed on the basis of notification received from the server apparatus by the image forming apparatus.

According to a further aspect of the present invention, there is provided a server apparatus capable of communicating with the image forming apparatus, comprising: an analyzing unit configured to receive operation history data relating to an operation history of the image forming apparatus, collected in the image forming apparatus on the basis of a collection data setting which is a setting relating to collection of data and configured to analyze the received operation history data; and a collection data setting unit configured to provide notification to the image forming apparatus so that the collection data setting is changed on the basis of an analysis result of the analyzing unit.

Figure 3:
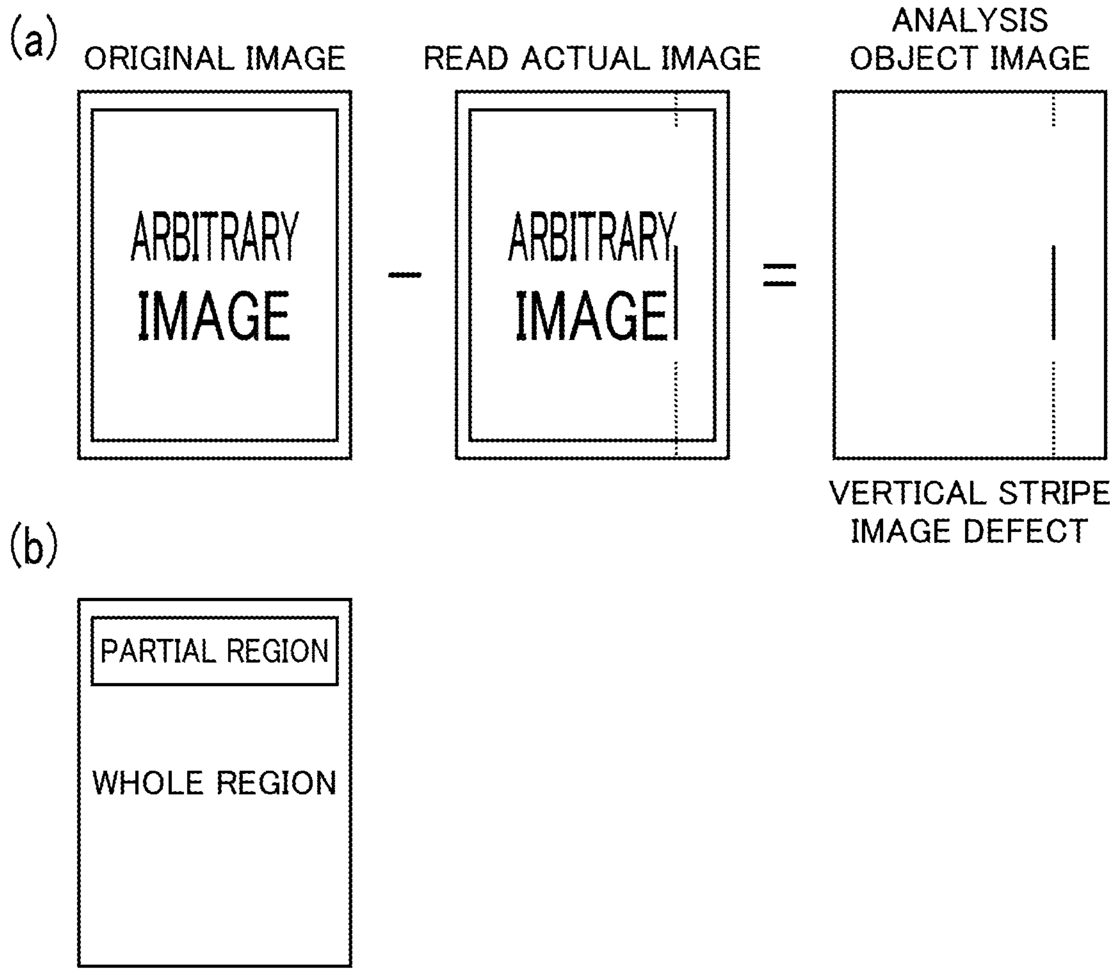

Parts (a) and (b) of FIG. 3 are schematic views for illustrating image information analyzing processing.

Figure 4:
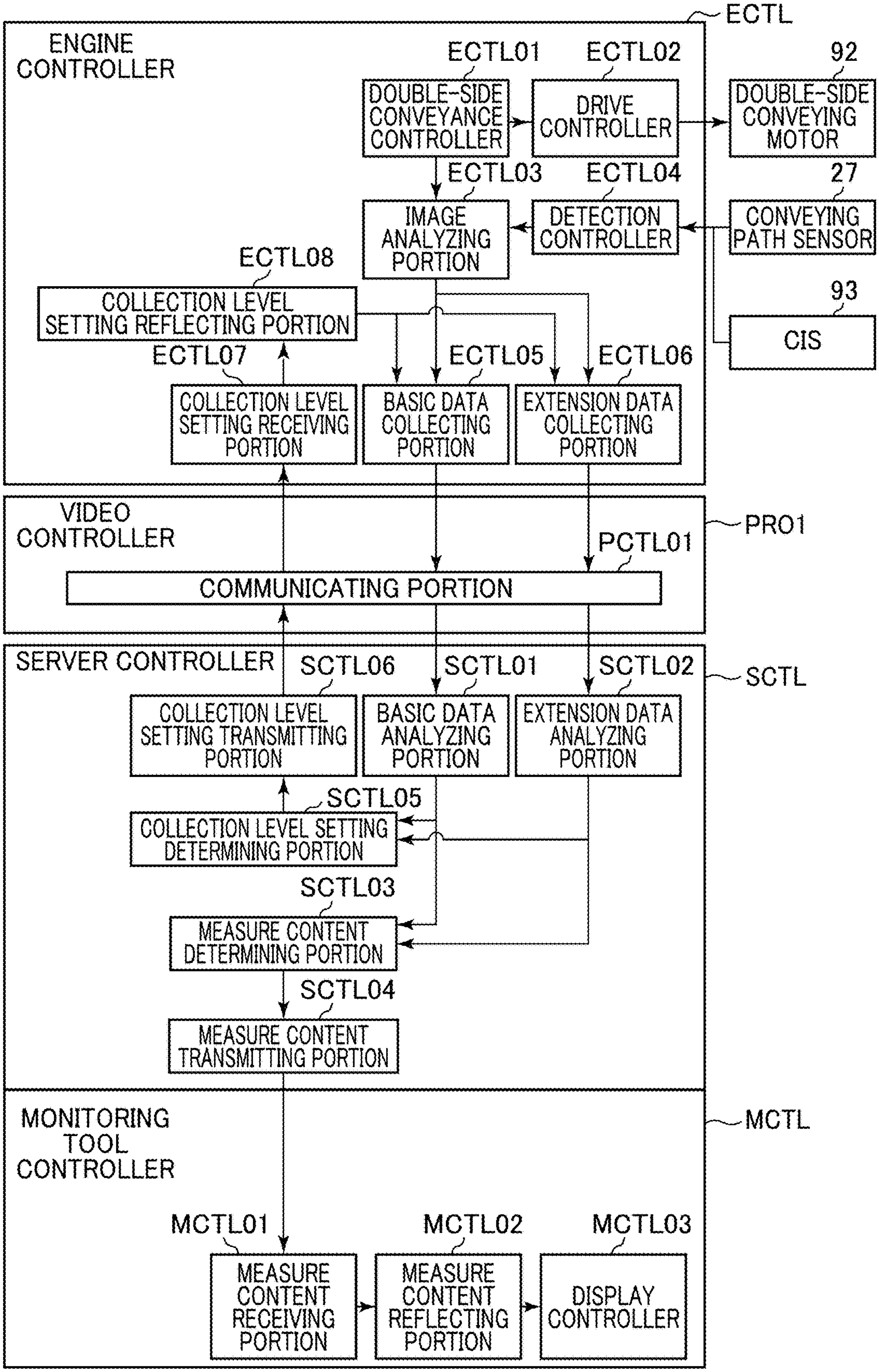

FIG. 4 is a schematic view showing functional blocks of an image forming system of an embodiment 1.

Figure 5:
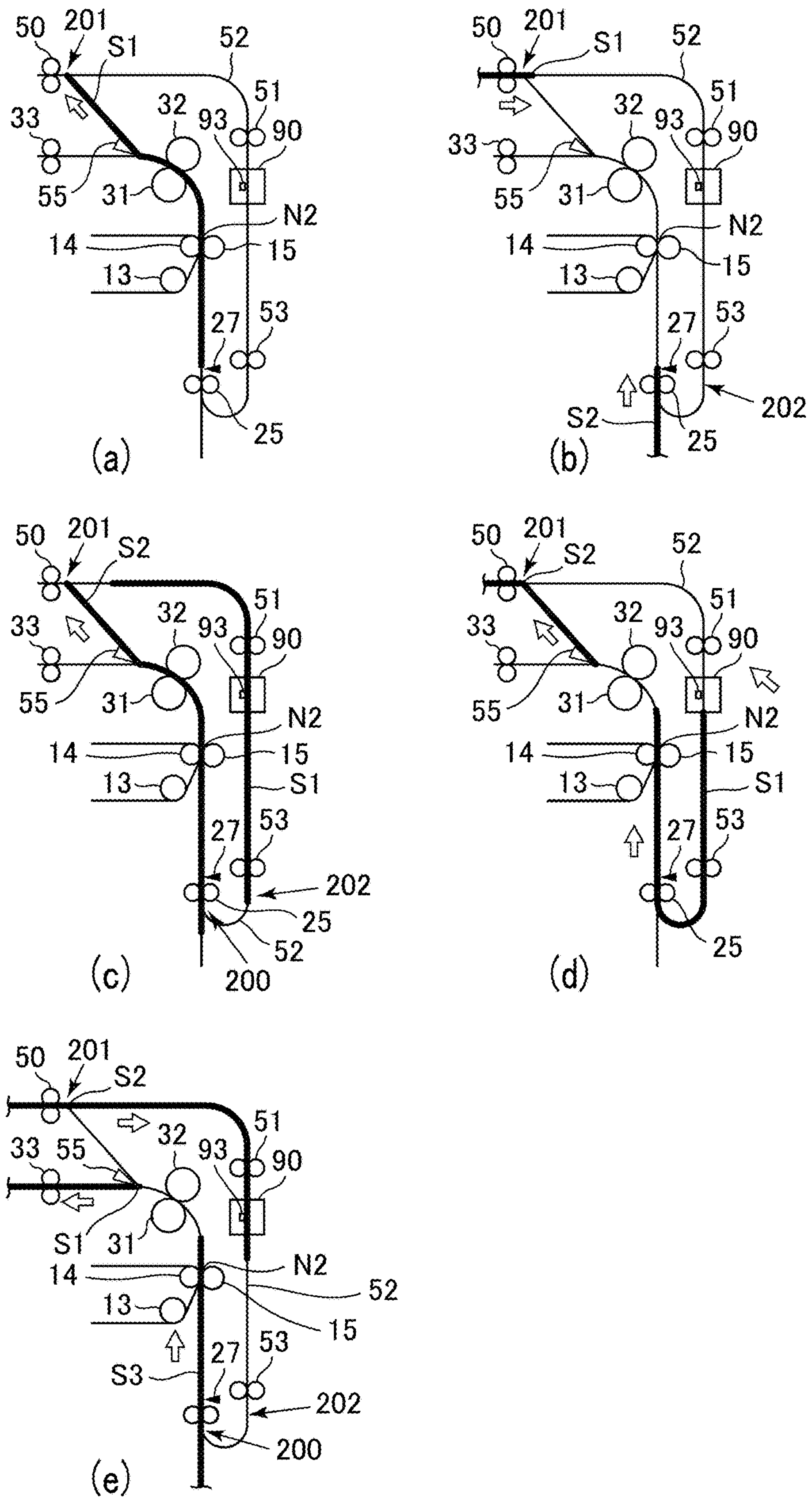

Parts (a) to (e) of FIG. 5 are schematic views for illustrating double-side conveying control.

Figure 6:
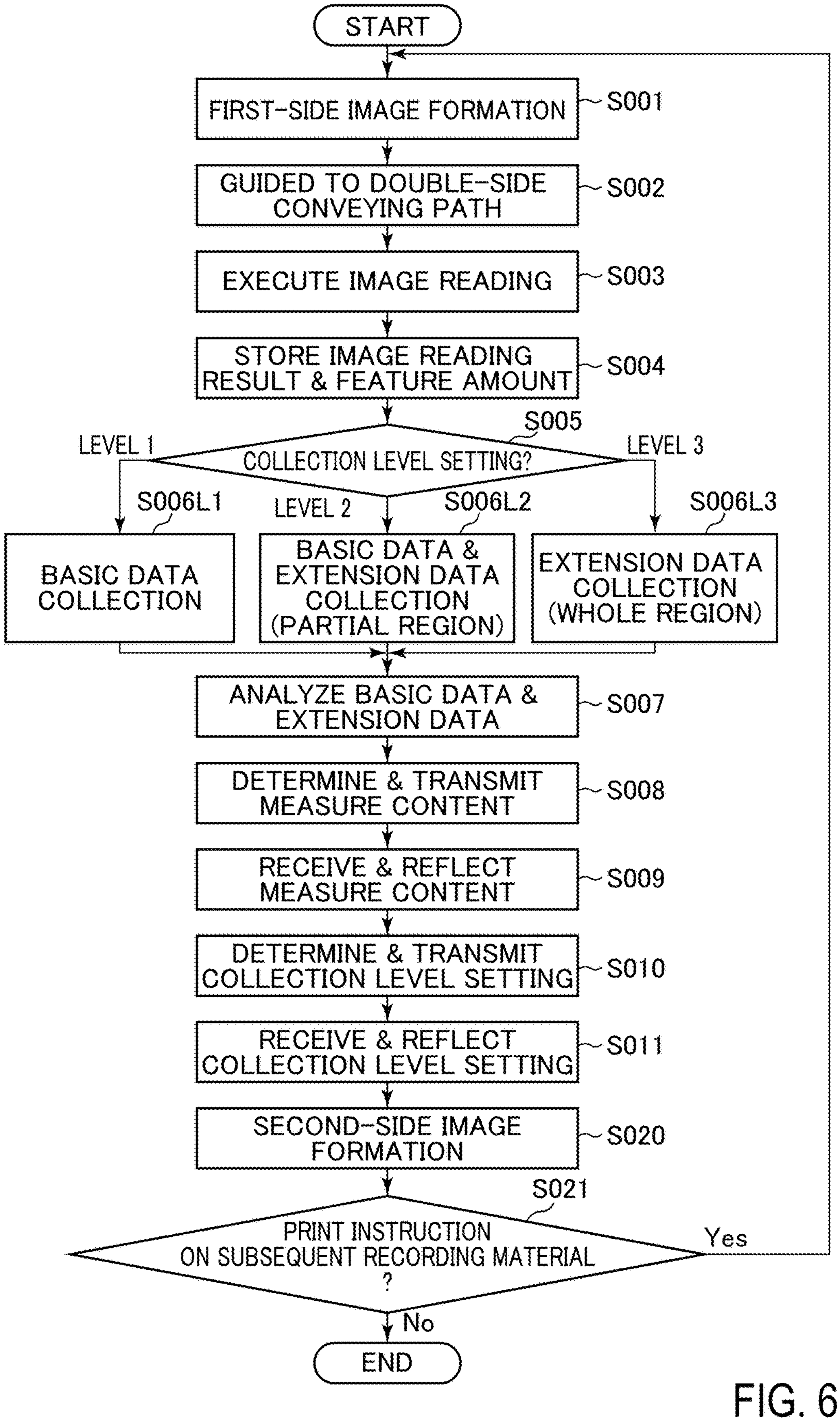

FIG. 6 is a flowchart for illustrating control in the embodiment 1.

Figure 7:
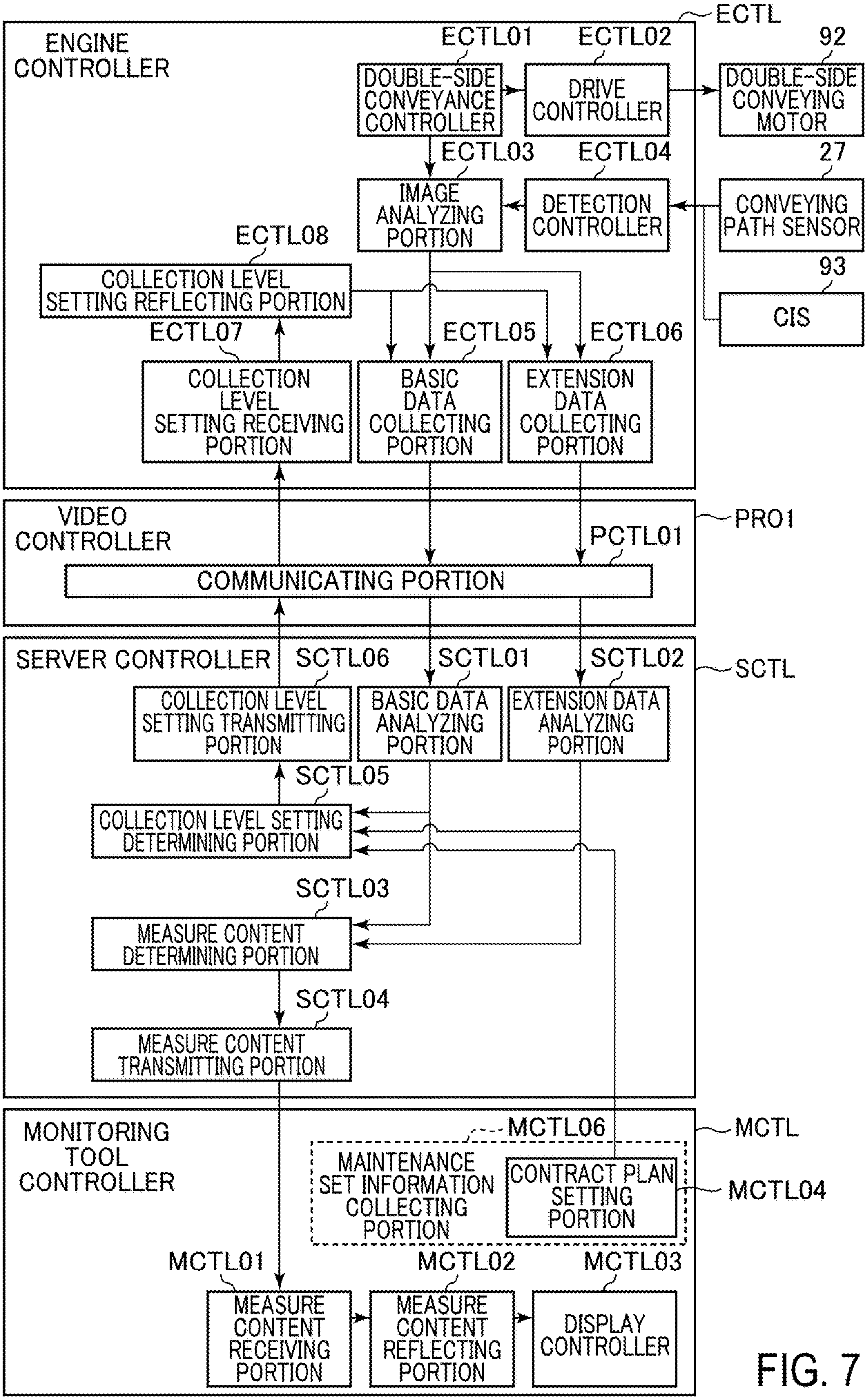

FIG. 7 is a schematic view showing functional blocks of an image forming system of an embodiment 2.

FIG. 8 is a schematic view showing an example of a contract plan setting screen in the embodiment 2.

Figure 9:
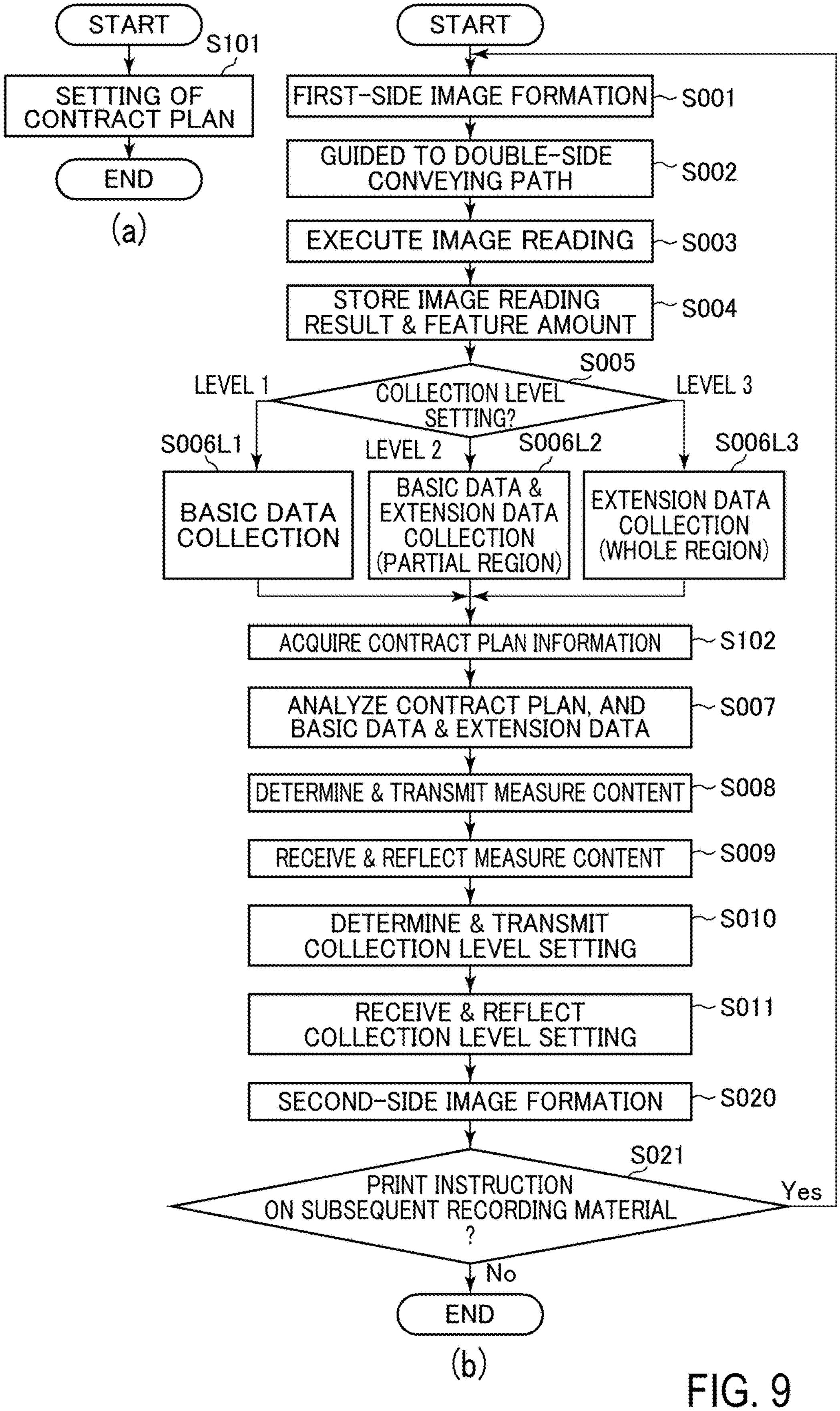

Parts (a) and (b) of FIG. 9 are flowcharts for illustrating control in the embodiment 2.

Figure 10:
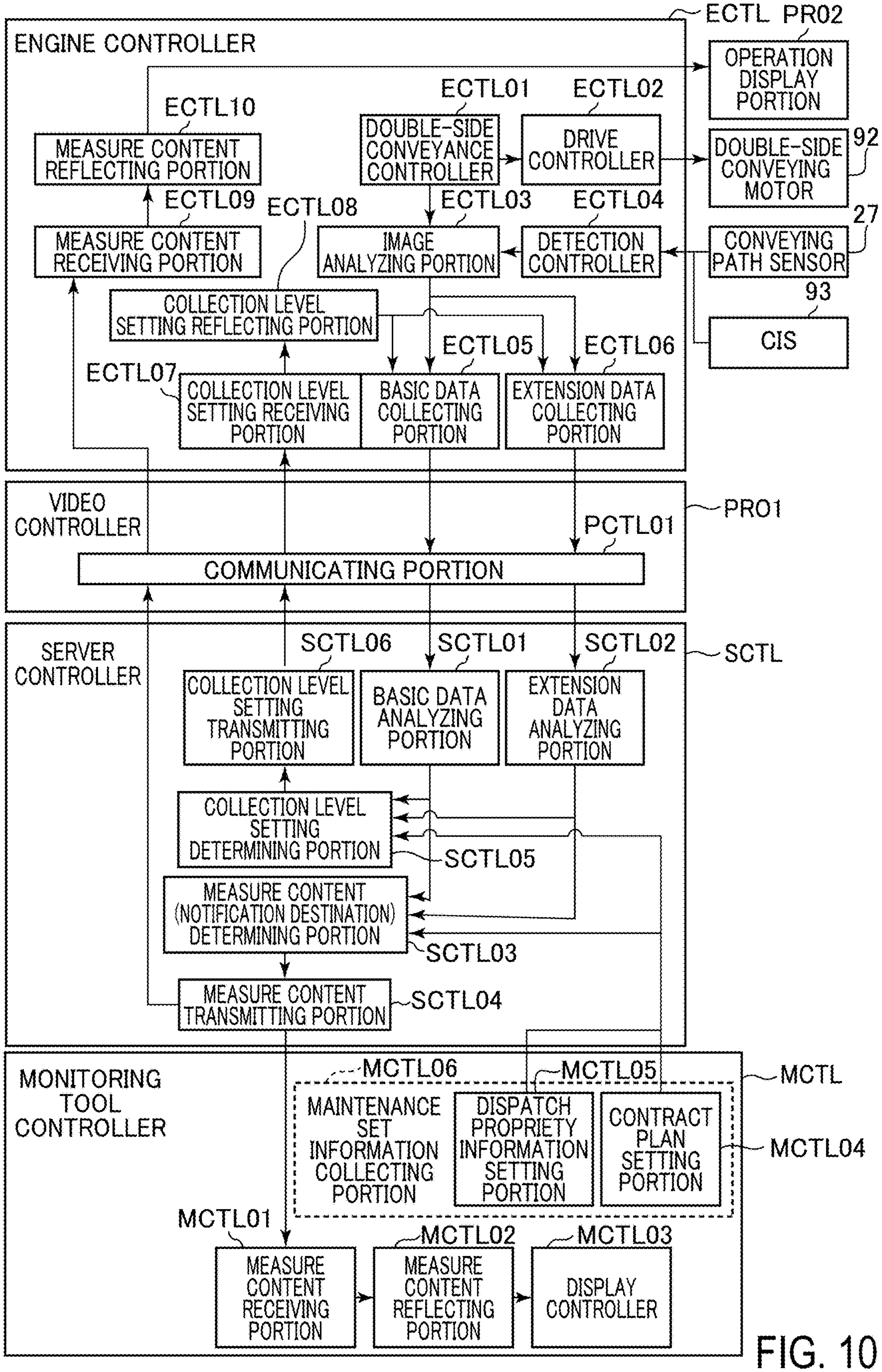

FIG. 10 is a schematic view showing functional blocks of an image forming system of an embodiment 3.

Figure 11:
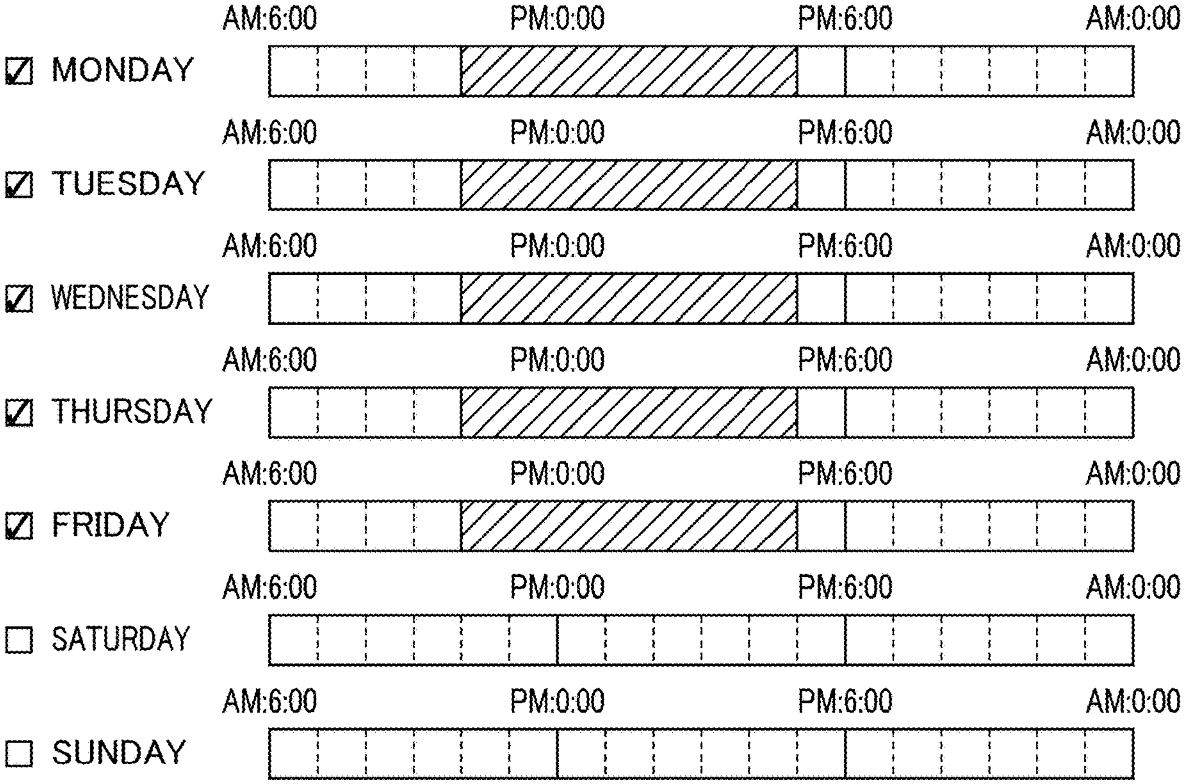

FIG. 11 is a schematic view showing an example of a maintenance information collecting screen in the embodiment 3.

Figure 12:
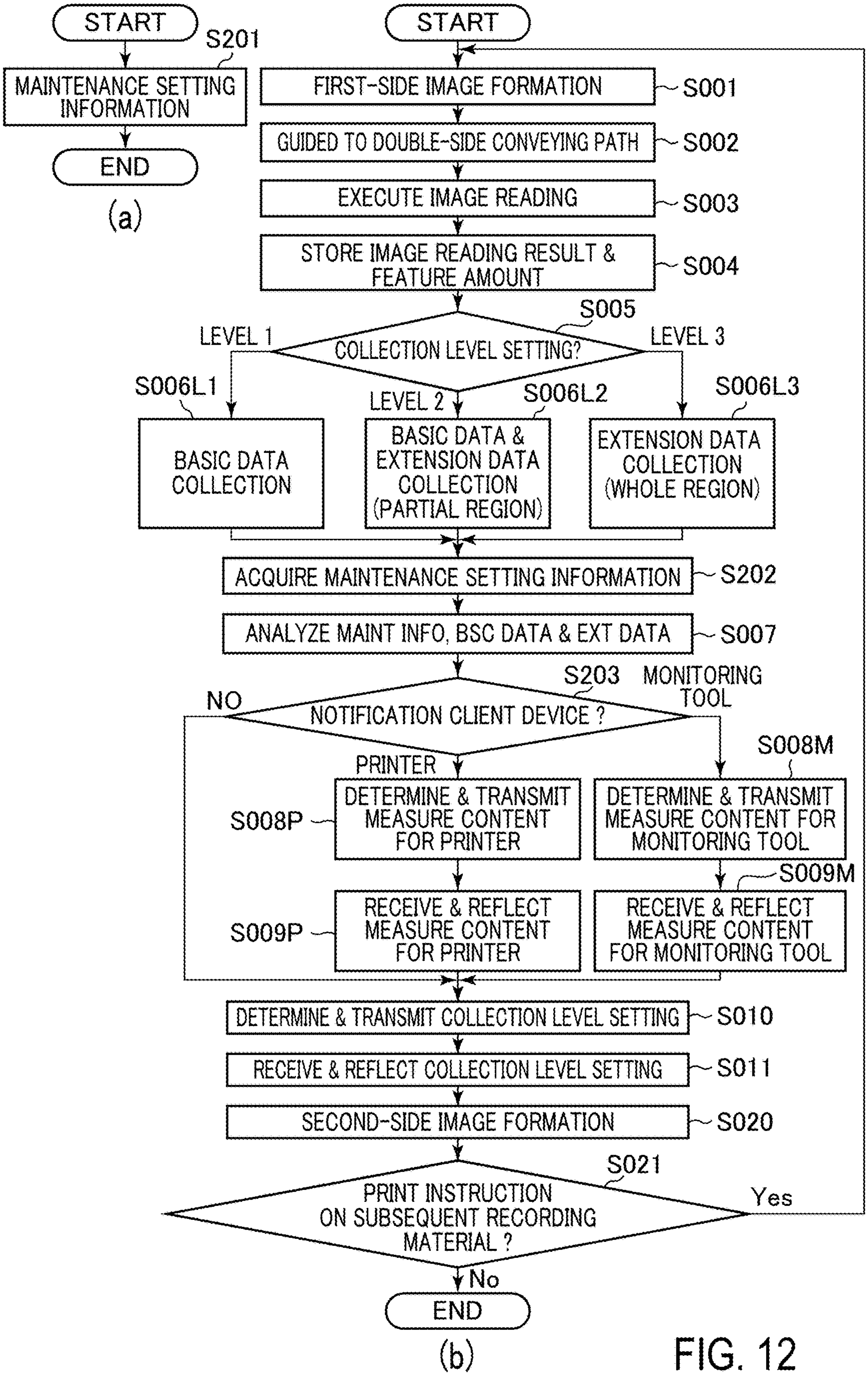

Parts (a) and (b) of FIG. 12 are flowcharts for illustrating control in the embodiment 3.

DESCRIPTION OF THE EMBODIMENTS

In the following, an image forming system, an image forming apparatus, and a server apparatus according to the present invention will be described more specifically with reference to the drawings.

Embodiment 1

Figure 1:
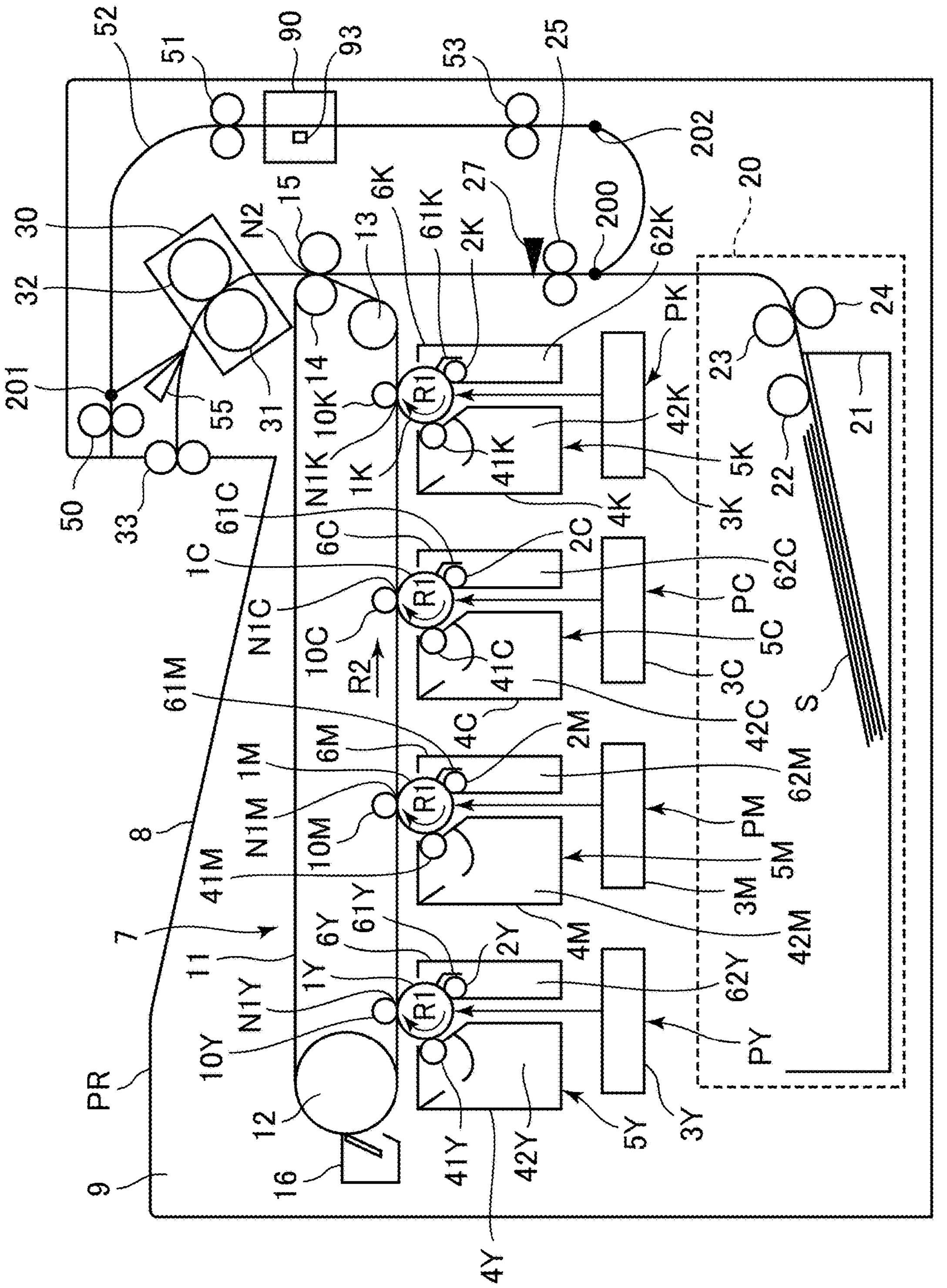
FIG. 1 is a schematic sectional view of an image forming apparatus.

<Image Forming Apparatus: FIG. 1>

A schematic structure of the image forming apparatus of an embodiment 1 will be described. The image forming apparatus of this embodiment is a color laser printer of a tandem type employing an intermediary transfer type capable of forming a full-color image on a sheet-like recording material S with use of an electrophotographic type. FIG. 1 is a schematic sectional view of a printer PR of this embodiment. Incidentally, in the printer PR, as the recording material S, paper is principally used, and therefore, the recording material S is referred to as paper in some instances, but the recording material S is not limited to the paper. As the recording material S, it is also possible to use materials other than paper or constituted by materials containing the materials other than the paper, such as synthetic paper constituted by materials principally comprising synthetic resin; films; special paper such as metallized paper having a metal layer.

The printer PR includes, as a plurality of image forming portions, for image forming portions PY, PM, PC, and PK for forming toner images of colors of yellow (Y), magenta (M), cyan (C), and black (K). These image forming portions PY, PM, PC, and PK are arranged and disposed along a movement direction of an image transfer surface disposed substantially horizontally relative to an intermediary transfer belt 11 described later. The printer PR is constituted so as to output a color image by superposing flour color toner images formed by the image forming portions PY, PM, PC, and PK, respectively. Incidentally, as regards elements provided for the respective colors and having identical or corresponding functions or constitutions, these elements are collectively described in some instances by omitting suffixes Y, M, C, and K of reference numerals or symbols each showing the element for an associated color.

In this embodiment, each of the image forming portions P is constituted by including a photosensitive drum 1, a charging roller 2, an exposure device 3, a developing device 4, a cleaning device 6, and the like. Further, in this embodiment, in each of the image forming portions P, the photosensitive drum 1 and, as process units actable on the photosensitive drum 1, the charging roller 2, the developing device 4, and the cleaning device 6 integrally constitute a process cartridge 5 detachably mountable to an apparatus main assembly 9. Further, below the process cartridge 5, the exposure device (laser unit) 3 is disposed. In this embodiment, the apparatus main assembly 9 of the printer PR is a portion excluding the process cartridges 5Y, 5M, 5C, and 5K from the printer PR.

The photosensitive drum 1 which is a rotatable drum-type electrophotographic photosensitive member (photosensitive member) is rotationally driven in an arrow R1 direction (clockwise direction) by transmitting thereto a driving force from a drum driving motor (not shown) as a driving unit. A surface of the rotating photosensitive drum 1 is electrically charged uniformly to a predetermined polarity (negative polarity in this embodiment) and a predetermined potential by the charging roller 2 which is a roller-type charging member as a charging unit. During the charging, to the charging roller 2, by a charging power source (not shown) as a charging voltage applying unit, a predetermined charging voltage (charging bias) of the same polarity (negative polarity in this embodiment) as a charge polarity of the photosensitive drum 1 is applied. The charged surface of the photosensitive drum 1 is subjected to scanning exposure to light on the basis of an image signal by the exposure device 3 as an exposure unit, so that an electrostatic latent image (latent image) is formed on the photosensitive drum 1. The electrostatic latent image formed on the photosensitive drum 1 is developed (visualized) by being supplied with toner as a developer by the developing device 4 as a developing unit, so that a toner image (toner picture, developer image) is formed on the photosensitive drum 1. The developing device 4 includes a developing roller 41 as a developer carrying member (developing member) and a developing container 42 for accommodating the toner. The developing roller 41 is rotationally driven by transmitting thereto a driving force from the drum driving motor (not shown) as the driving unit. The developing roller 41 conveys the toner toward a developing portion which is an opposing portion (contact portion) to the photosensitive drum 1 while carrying the toner in the developing container 42, so that the toner is deposited on the photosensitive drum 1 depending on the electrostatic latent image on the photosensitive drum 1. During the development, to the developing roller 41, by a developing power source (not shown) as a developing voltage applying unit, a predetermined developing voltage (developing bias) of the same polarity (negative polarity in this embodiment) as the charge polarity of the photosensitive drum 1 is applied. In this embodiment, on an exposed portion (image portion) of the photosensitive drum 1 lowered in absolute value of the potential by being exposed to light after being uniformly charged, the toner charged to the same polarity (negative polarity in this embodiment) as the charge polarity of the photosensitive drum 1 is deposited (reverse development type). In this embodiment, a normal charge polarity of the toner which is a principal charge polarity of the toner is the negative charge polarity.

An intermediary transfer unit 7 is provided so as to oppose the four photosensitive drums 1Y, 1M, 1C, and 1K. The intermediary transfer unit 7 is constituted by including the intermediary transfer belt 11, three stretching rollers 12, 13, and 14, and four primary transfer rollers 10Y, 10M, 10C, and 10K. The intermediary transfer belt 11 constituted by a rotatable endless between as an intermediary transfer member is disposed so as to oppose the four photosensitive drums 1Y, 1M, 1C, and 1K. The intermediary transfer belt 11 is extended around, as the plurality of stretching rollers, a tension roller 12, a driving roller 13, and a secondary transfer opposite roller 14 and is stretched by these rollers with a predetermined tension. The driving roller 13 is rotationally driven by transmitting thereto a driving force from a belt driving motor (not shown) as a driving unit. The intermediary transfer belt 11 is rotated (circulated and moved) in an arrow R2 direction (counterclockwise direction) by transmitting thereto a driving force from the driving roller 13. On an inner peripheral surface side of the intermediary transfer belt 11, the primary transfer rollers 10 which are roller-type primary transfer members as primary transfer units are disposed correspondingly to the photosensitive drums 1Y, 1M, 1C, and 1K. Each of the primary transfer rollers 10 is pressed toward the associated photosensitive drum 1 and is contacted to the photosensitive drum 1 through the intermediary transfer belt 11, and forms a primary transfer portion (primary transfer nip) N1 which is a contact portion between the photosensitive drum 1 and the intermediary transfer belt 11. The toner image formed on the photosensitive drum 1 is transferred (primarily transferred) onto the rotating intermediary transfer belt 11 in the primary transfer portion N1 by the action of the primary transfer roller 10. During the primary transfer, to the primary transfer roller 10, by a primary transfer power source (not shown) as a primary transfer voltage applying unit, a predetermined primary transfer voltage (primary transfer bias) of an opposite polarity (positive polarity in this embodiment) to the normal charge polarity of the toner is applied. For example, during full-color image formation, the toner images of the colors of yellow, magenta, cyan, and black are successively transferred superposedly onto the intermediary transfer belt 11.

By this, the four color toner images are conveyed to the secondary transfer portion described later in a state in which the toner images are superposed on the intermediary transfer belt 11.

On an outer peripheral surface side of the intermediary transfer belt 11, in a position opposing the secondary transfer opposite roller (inner secondary transfer roller) 14, a secondary transfer roller (outer secondary transfer roller) 15 which is a roller-type secondary transfer member as a secondary transfer unit is provided. The secondary transfer roller 15 is pressed toward the secondary transfer opposite roller 14, and is contacted to the secondary transfer opposite roller 14 through the intermediary transfer belt 11, and thus forms a secondary transfer portion (secondary transfer nip) N2 which is a contact portion between the intermediary transfer belt 11 and the secondary transfer roller 15. The toner images formed on the intermediary transfer belt 11 are transferred (secondarily transferred) onto the recording material S, nipped and conveyed by the intermediary transfer belt 11 and the secondary transfer roller 15, in the secondary transfer portion N2 by the action of the secondary transfer roller 15. During the secondary transfer, to the secondary transfer roller 15, by a secondary transfer power source (not shown) as a secondary transfer voltage applying unit, a predetermined secondary transfer voltage (secondary transfer bias) of the opposite polarity (positive polarity in this embodiment) to the normal charge polarity of the toner is applied. The recording material (transfer material, recording medium, sheet) S is conveyed from a sheet (paper) feeding portion 20 toward the secondary transfer portion N2. The sheet feeding portion 20 includes a sheet feeding cassette 21 as a recording material accommodating portion, a sheet feeding roller 22 as a sheet feeding member, a conveying roller 23 as a conveying member and a separation roller 24 as a separation conveying member. The recording material S accommodated in the sheet feeding cassette 21 is sent from the sheet feeding cassette 21 by the sheet feeding roller 22. The recording material S fed by the sheet feeding roller 22 is separated and conveyed one by one by the conveying roller 23 and the separation roller 24. Then, the recording material S conveyed from the sheet feeding portion 20 is conveyed toward the secondary transfer portion N2 by a registration roller pair 25 as a synchronization conveyance member while being timed to the toner images on the intermediary transfer belt 11.

The recording material S on which the toner images are transferred is conveyed toward a fixing device 30 as a fixing unit. The fixing device 30 includes a fixing film 31 as a rotatable fixing member provided with a heat source on an inner peripheral surface side thereof and includes a pressing roller 32 as a rotatable pressing member. The recording material on which unfixed toner images are carried is heated and pressed in a process in which the recording material S is nipped and conveyed by the fixing film 31 and the pressing roller 32, so that the toner images are fixed (melted, stuck) on a surface of the recording material S. In the case of one-side printing, the recording material S on which the toner images are fixed is discharged (outputted) to an outside of the apparatus main assembly 9 (i.e., outside the image forming apparatus) by a discharging roller pair 33 as a discharging member, so that the recording material S is stacked on a tray 8 as a discharge portion provided at an upper portion of the apparatus main assembly 9.

Further, toner (primary transfer residual toner) remaining on the photosensitive drum 1 after the primary transfer is removed and collected from the surface of the photosensitive drum 1 by the cleaning device 6 as a cleaning unit. The cleaning device 6 includes a cleaning blade 61 as a cleaning member, and a residual toner container 62 for accommodating the toner. The cleaning device 6 scrapes off the primary transfer residual toner from the surface of the rotating photosensitive drum 1 by the cleaning blade 61 and collects the primary transfer residual toner in the residual toner container 62. Further, a deposited matter such as toner (secondary transfer residual toner) remaining on the intermediary transfer belt 11 after the secondary transfer is removed and collected from the intermediary transfer belt 11 by a belt cleaning device 16 as an intermediary transfer member cleaning unit.

Incidentally, in a conveying path from the registration roller pair 25 to the secondary transfer portion N2, a conveying path sensor 27 as a recording material developing unit is provided. The conveying path sensor 27 is a sensor for discriminating an occurrence of a gam due to conveyance abnormality such as early arrival or delay. In the case where the conveying path sensor 27 discriminated that the jam occurred, the printer PR causes an operation display portion PR02 (FIG. 2) provided in the predetermined PR to display a massage to the effect that the jam occurred. Further, the printer PR causes the operation display portion RO02 to display information on a unit for cleaning the jam as desired.

Further, the printer PR is constituted so as to perform double-side printing (automatic double-side printing). In the case of the double-side printing, the recording material S which passed through the fixing device 30 and on which first surface (first side) an image is formed is not discharged to the outside of the image forming apparatus, and an image is formed on a second surface (second side) of the recording material S. That is, the recording material S which passed through the fixing device 30 and on which first surface the image is formed is conveyed in a direction toward a reversing point 201. A double-side flapper 55 is capable of switching a conveying direction of the recording material S to a discharging direction and a reversing portion direction. In the case where the double-side printing is performed, the double-side flapper 55 switches the conveying direction of the recording material S to the reversing portion direction before a leading end, with respect to the conveying direction, of the recording material S on which first surface the image has already been formed reaches the double-side flapper 55. The recording material S passes through the reversing point 201, and then is conveyed by a reversing roller pair 50 in a direction in which the recording material S is discharged to the outside of the image forming apparatus. The reversing roller pair 50 is once rotation-stopped in a period in which a trailing end of the recording material S with respect to the conveying direction passes through the reversing point 201 and is present in a position of the reversing roller pair 50. Then, the reversing roller pair 50 is rotated in a direction opposite to the previous direction, so that the recording material S is conveyed in a direction toward a double-side conveying path 52. In the double-side conveying path 52, this recording material S is successively conveyed to a sheet re-feeding waiting point 202 and a merging point 200 by a double-side conveying roller pair 51 and a sheet re-feeding roller pair 53. The reversing roller pair 50, the double-side conveying roller pair 51, and the sheet re-feeding roller pair 53 are rotated by transmitting thereto a driving force from a double-side conveying motor 92 (FIG.

2) as a driving unit. The double-side conveying path 52 merges with a conveying path of the recording material S in the merging point 200 between the conveying roller 23 and the registration roller pair 25. The recording material S turned upside down by passing through the double-side conveying path 52 is conveyed toward the secondary transfer portion N2 by the registration roller pair 25. Then, the toner image on the intermediary transfer belt 11 is transferred onto the second surface (side) of the recording material S. The toner image transferred on the second surface of the recording material S is fixed on the recording material S by the fixing device 30. Further, the double-side flapper 55 switches the conveying direction of the recording material S to the discharging direction, whereby the recording material S on which both surfaces (sides) the images are formed is discharged to the outside of the image forming apparatus.

Further, in this embodiment, in the double-side conveying path 52, an image reading portion 90 as a detecting unit is provided. The image reading portion 90 is constituted by including a CIS (Contact Image Sensor) 93, a light emitting element (not shown), and the like. The image reading portion 90 starts reading of the recording material S conveyed in the double-side conveying path 52 and the image on the recording material S at a predetermined timing. The image reading portion 90 converts the read image into a time-series digital pixel signal, and stores the converted pixel signal as scan image data in a memory (not shown).

Figure 2:
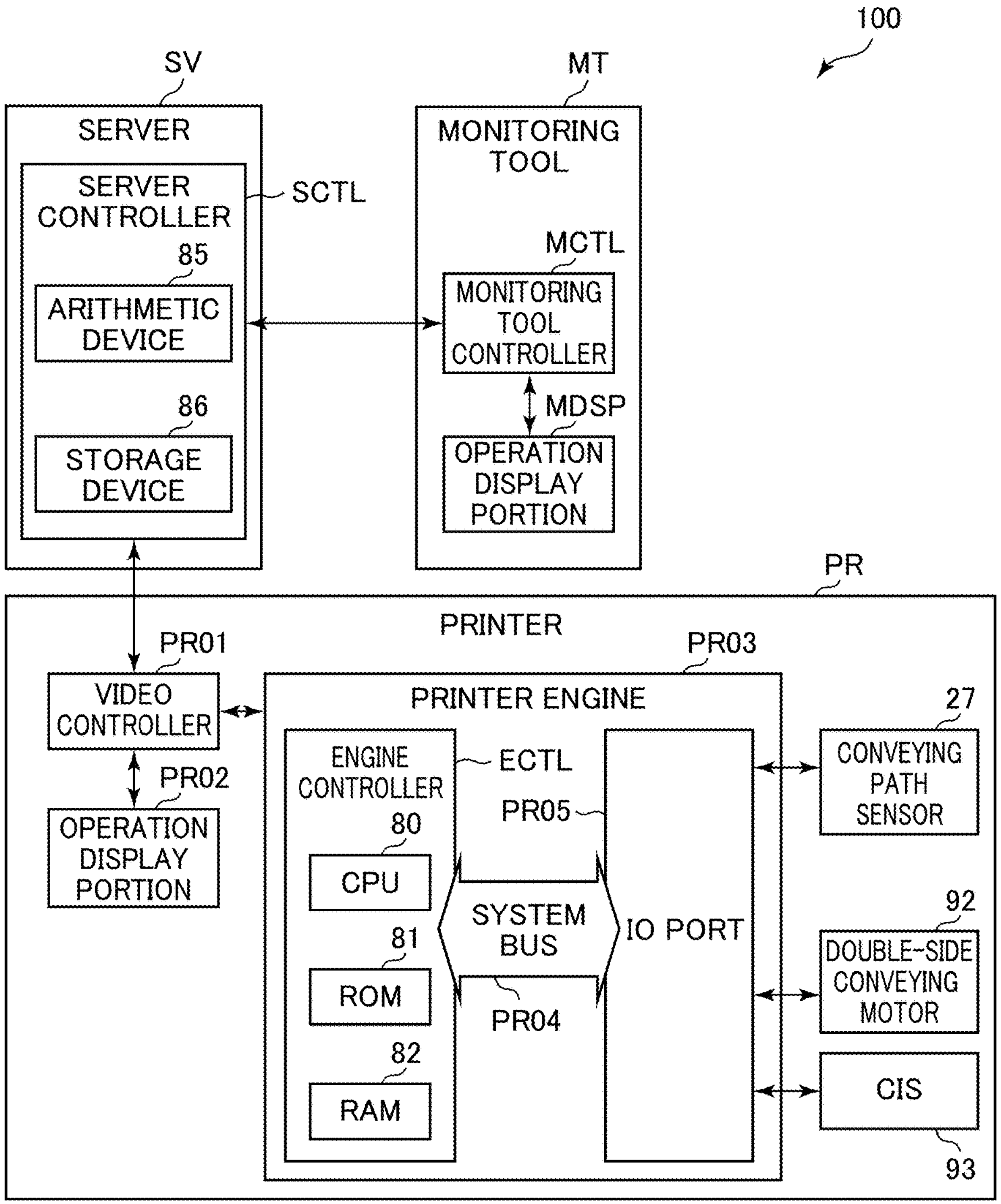
FIG. 2 is a schematic view showing a hardware constitution of an image forming system.

<Hardware Constitution: FIG. 2>

FIG. 2 is a schematic view for illustrating a hardware constitution of the image forming system 100 in this embodiment. In this embodiment, the image forming system 100 includes the printer PR, a server SV, and a monitoring tool MT.

The printer PT includes a video controller PRO1, the operation display portion PR02, and a printer engine PR03. Here, the operation display portion PR02 included in the printer PT is constituted by including an operation panel, operation buttons, and the like which are not shown. The operation panel may include a display portion for displaying information and may have a function of an inputting portion for inputting the information. The operation buttons function as the inputting portion for inputting the information. The video controller PR01 sends print data (image information) and print instruction, sent from a host computer (external device) such as an unshown personal computer, to the printer engine PR03. The printer engine PR03 includes a CPU 80 as an arithmetic processing portion, an engine controller ECTL provided with a ROM81 and a RAM82 which are as a storing portion, a system bus PR04, and an IO port PR05. Further, the respective devices, for example, the image forming portions, the intermediary transfer unit 7, the secondary transfer roller 15, the fixing device 30, various driving portions, and various power sources, which are for executing the above-described process for forming the image on the recording material S constitute the printer engine PR03.

The CPU 80 executes loads a program and various data, stored in the ROM81, into the RAM82, and executes the program by using the RAM82 as an operation area. The engine controller ECTL is connected with the IO port PR05 via the system bus PR04 accessible bi-directional. By this, the engine controller ECTL and the IO port PR05 are accessible bidirectionally to each other. To the IO port PR05, the respective devices of the printer PR such as the conveying path sensor 27, the double-side conveying motor 92 and the CIS 93 are connected. The CPU 80 controls the respective devices of the predetermined PR via the IR port PR05. By this, the engine controller ECT causes the printer PR to execute various operations such as image formation. Incidentally, in FIG. 2, as an example of devices connected to the engine controller ECTL via the IO port PR05, the conveying path sensor 27, the double-side conveying motor 92, and the CIS93 which are particularly noticed in relation to this embodiment are shown. However, the devices connected to the engine controller ECTL via the IO port PR05 are not limited to these devices.

The server SV includes a server controller SCTL provided with an arithmetic device 85 and a storage device 86. The server SV is connected to each of the printer PR and the monitoring tool MT through a bidirectionally accessible network. By this, the server SV and each of the printer PR and the monitoring tool MT are accessible bidirectionally to each other. The arithmetic device 85 performs execution of a program stored in the storage device 86, and reading and writing of various data. A CPU, a GPU or the like may be assigned directly to the arithmetic device 85, and a RAM, an HDD, an SSD, or the like may be assigned directly to the storage device 86. Further, a virtual environment such as a virtual machine may be assigned to these devices 85 and 86. The server controller SCTL of the server is capable of delivering information between itself and the engine controller ECTL of the printer PR via the video controller PRO1 of the printer PR. Further, the server controller SCTL of the server SV is capable of delivering information between itself and a monitoring tool controller MCTL of the monitoring tool MT through a network such as the Internet.

The monitoring tool MT includes the monitoring tool controller MCTL for receiving information from the server controller SCTL and an operation display portion MDSP for displaying the received information. The monitoring tool MT is constituted by a personal computer, for example.

Here, the operation display portion MDSP included by the monitoring tool MT is constituted by a display, a keyboard, a mouse, or the like which are not shown. Specifically, a function of the monitoring tool MT is realized by executing, for example, software, installed in the personal computer, by the personal computer. Incidentally, a form of the monitoring tool MT is not limited to the personal computer, but may also be a virtual environment such as a virtual machine, or a tablet terminal or a dedicated device. These devices can each be said as an example of an information processing device.

<Image Information Analysis Processing: FIG. 3, Table 1>

In this embodiment, in the engine controller ECTL and the server controller SCTL, an image defect called a "vertical stripe" such that a stripe-shaped toner image which is not an original image is formed on the recording material S is detected. A specific detection algorithm will be described using part (a) of FIG. 3. Part (a) of FIG. 3 is a schematic view for illustrating the detection algorithm of the vertical stripe in this embodiment.

First, original image information on the image intended to be formed on the recording material S and actual image information on an image actually read by the image reading portion 90 are acquired. The original image information can be acquired from, for example, a memory (RAM82 or the like) of the engine controller ECTL, and the actual image information can be acquired from, for example, a memory (not shown) of the image reading portion 90. Further, in order to execute positional alignment between two images, a position where a difference between the two images is smallest is acquired. The positional alignment between the two images can be executed by using, for example, an arbitrary method such as a well-known method. After the positional alignment is executed, an image acquired by taking and difference between the actual image and the original image is used as an analysis object image. Then, to the analysis object image, a filter for enhancing an edge in a vertical direction, for example, a Sobel filter is applied, and a variation in image density with respect to the vertical direction relative to the image data after the edge enhancement is used as a feature amount. The variation in image density with respect to the vertical direction can be acquired by using, for example, an arbitrary method such as a method in which a deviation well known in the field. Further, for example, in the case where there is a feature amount not less than a predetermined threshold, it is possible to discriminate that the image defect occurred. Here, the vertical direction is a direction substantially parallel to the conveying direction (surface movement direction of the photosensitive drum 1, sub-scan direction) of the recording material S, and a lateral direction in a direction substantially parallel to a rotational axis direction (main scan direction) of the photosensitive drum 1. Further, the image density is represented by density levels of 256 stages from 0 to 255.

In this embodiment, it is assumed that the vertical stripe is caused due to a contamination (for example, toner sticking onto a surface of the fixing film 31) of the fixing device 30.

Incidentally, in this embodiment, detection of the vertical stripe by the above-described algorithm is performed in some detecting forms shown in a table 1 appearing hereinafter. In "Type 1", a feature amount detected by the engine controller ECTL is sent to the server controller SCTL, and therefore, a sent data amount and a calculation amount executed by the server controller SCTL are small, but analysis accuracy is low. On the other hand, in "Type 2" and "Type 3", image data detected by the engine controller ECTL is sent to the server controller SCTL and a feature amount is calculated by the server controller SCTL, and therefore, the sent data amount and the calculation amount executed by the server controller SCTL become large, but the analysis accuracy can be enhanced. As regards the "Type 2", calculation of the feature amount is performed by both of the engine controller ECTL and the server controller SCTL. That is, a feature amount of a whole region of an image is calculated by the engine controller ECTL, and is not only sent to the server controller SCTL, but also image data of a partial region of the image is sent to the server controller SCTL, and then a feature amount of the partial region is calculated by the server controller SCTL. Thus, in the "Type 2", detailed analysis of the partial region of the image is performed by the server controller SCTL, so that lowness of the analysis accuracy in the "Type 1" is compensated. Part (b) of FIG. 3 is a schematic view for illustrating image regions in which calculation of the feature amount is performed. An "IR (image region)" shown in the table 1 shows the image regions in which calculation of the feature amount is performed, and compared with analysis using the partial region of the image, analysis using the whole region of the image leads to improvement in analysis accuracy. Further, "RP (resolving power)" shown in the table 1 shows a unit subjected to the above-described image processing, and compared with the case where a value thereof is small, the case where the value thereof is large leads to improvement in analysis accuracy. The partial region of the image can be appropriately selected depending on desired analysis accuracy or the like, but in an example shown in part (b) of FIG. 3, the partial region is a region which is about ¼ of the image in the vertical direction.

TABLE 1

| DR*[1] | CTL*[2] | IR*[3] | RP*[4] | AA*[5] |
|---|---|---|---|---|
| Type 1 | ECTL | WHOLE | 10 × 10 pixels | LOW |
| Type 2 | ECTL | WHOLE | 10 × 10 pixels | MEDIUM |
| | SCTL | PARTIAL | 1 × 1 pixel | |
| Type 3 | SCTL | WHOLE | 1 × 1 pixel | HIGH |

*[1]"DF" is the detection form.
*[2]"CTL" is the controller for performing the calculation of the feature amount. "ECTL" is the engine controller, and "SCTL" is the server controller.
*[3]"IR" is the image region. "WHOLE" is the whole region, and "PARTIAL" is the partial region.
*[4]"RP" is the resolving power.

<Function Block: FIGS. 4 and 5, Tables 2 to 7>

Functions of the engine controller ECTL, the video controller PRO1, the server controller SCTL, and the monitoring tool controller MCTL in this embodiment will be described using FIG. 4. FIG. 4 is a schematic view showing functional blocks of the engine controller ECTL, the video controller PR01, the server controller SCTL, and the monitoring tool controller MCTL.

The function of the engine controller ECTL is realized, for example, by that the CPU80 executes processing on the basis of the program stored in the ROM81 and the data stored in the RAM82. The function of the video controller PRO1 is realized, for example, by that a CPU (not shown) as an arithmetic processing portion in the video controller PRO1 executes processing on the basis of the program and the data which are stored in a ROM (not shown) and a RAM (not shown) which are as the storing portion. The function of the server controller SCTL is realized, for example, by that the arithmetic device 85 executes processing on the basis of the program and the data which are stored in the storage device 86. Further, the function of the monitoring tool controller MCTL is realized, for example, by that a CPU (not shown) as an arithmetic processing portion executes processing on the basis of the program and the data which are stored in a ROM (not shown) and a RAM (not shown) which are as the storing portion. However, all or a part of these functions may also be realized by a hardware circuit such as an ASIC (Application-Specific Integrated Circuit) or an FPGA (Field Programmable Gate Array).

The engine controller ECTL has a function of performing double-side conveyance control, a function of analyzing the image information, a function of collecting basic data relating to the operation history, a function of collecting extension data relating to the operation history, and a function of managing a collection level.

The server controller SCTL has a function of analyzing the image defect from the basic data, a function of analyzing the image defect from the extension data, a function of determining a measure content, a function of sending the measure content, a function of determining the collection level setting, and a function of sending the collection level setting.

The monitoring tool controller MCTL has a function of displaying the measure content.

Next, the above-described functions will be successively described.

(Function of Performing Double-Side Conveyance Control)

The engine controller ECTL includes, as functional blocks for performing double-side conveyance control, a double-side conveyance controller ECTL01 as a double-side conveyance control unit, and a drive controller ECTL02 as a drive control unit. The double-side conveyance controller ECTL01 performs the double-side conveyance control in the following order. FIG. 5 is a schematic sectional view of the neighborhood of the double-side conveying path 52 in the predetermined for illustrating the double-side conveyance control.

1. By controlling the double-side flapper 55, a first recording material S1 on which first surface (side) an image is formed is conveyed in a direction toward the reversing point 201 (part (a) of FIG. 5).
2. By providing an instruction of drive of the double-side conveying motor 92 to the drive controller ECTL02, the first recording material S1 is conveyed in a direction toward the sheet re-feeding waiting point 202 through the double-side conveying path 52. Further, a second recording material S2 is conveyed toward the secondary transfer portion N2 for forming the image on the first surface (part (b) of FIG. 5).
3. By providing an instruction of the drive of the double-side conveying motor 92 to the drive controller ECTL02, the first recording material S1 is caused to wait at the sheet re-feeding waiting point 202. During the waiting, the second recording material S2 on which first surface the image is formed is conveyed in the direction toward the reversing point 201 (part (c) of FIG. 5).
4. By providing an instruction of the drive of the double-side conveying motor 92 to the drive controller ECTL02, the first recording material S1 is fed again toward the registration roller pair 25 by the sheet re-feeding roller pair 53, and then starts formation (secondary transfer) of an image on a second surface (side) (part (d) of FIG. 5).
5. By controlling the double-side flapper 55, the first recording material S on which second surface the image is formed is conveyed in a direction toward the discharging roller pair 33 and then is discharged to the outside of the image forming apparatus. Further, by providing an instruction of the drive of the double-side conveying motor 92 to the drive controller ECTL02, the second recording material S2 is conveyed in a direction toward the merging point 200 through the double-side conveying path 52. Then, in order to form an image on the second surface, the second recording material S2 is conveyed toward the secondary transfer portion N2. Thereafter, a third recording material S3 is conveyed toward the secondary transfer portion N2 for forming the image on the first surface (part (e) of FIG. 5).

(Function of Analyzing Image Information)

The engine controller ECTL includes, as functional blocks for analyzing the image information, an image analyzing portion ECTL03 as an image analyzing unit and a detection controller ECTL04 as a detection control unit. The detection controller ECTL04 causes the CIS 93 to execute image reading when a leading end, with respect to the conveying direction, of the recording material S conveyed along the double-side conveying path 52 through control by the double-side conveyance controller ECTL01 reaches the image reading portion 90. Then, the detection controller ECTL04 delivers scan image data to the image analyzing portion ECTL03. The image analyzing portion ECTL03 causes the RAM82 to store not only the image data in association with image reading date/time but also a result of processing in which the feature amount is calculated in the detection form of the Type 1 shown in the table 1. The feature amount (basic data) is an example of data (operation history data) relating to the operation history of the image forming apparatus. In the following, a size of the scan image data will be described on the premise that the size is h pixels (vertical (sub-scan direction)×w pixels (lateral (main scan direction).

(Function of Collecting Basic Data)

The engine controller ECTL includes, as a functional block for collecting the basic data, a basic data collecting portion ECTL05 as a basic data collecting unit. The basic data collecting portion ECTL05 transmits the fixing amount (basic data), stored by the image analyzing portion ECTL03, to a communicating portion PCTL01 as a communicating unit included in the video controller PRO1. However, a transmission propriety setting is made by a collection level setting reflecting portion ECTL08 described later, and in the case where it is designated that the transmission is "invalid", transmission processing of the basic data is not performed. Further, when the feature amount is transmitted from the basic data collecting portion ECTL05, the communicating portion PCTL01 notifies the b controller server SCTL of the image reading gate/time and the feature amount. The server controller SCTL causes the storage device 86 to store the image reading data/time and the feature amount. The basic data collecting portion ECTL05 may directly transmit the image reading date/time and the feature amount to the basic data analyzing portion SCTL01 of the server controller SCTL described later via the communicating portion PCTL01 included in the video controller PRO1. Incidentally, an example of the stored basic data is shown in table 2. In the table 2, "n" represents an integer portion of w/10 (corresponding to the resolving power of 10 pixels shown in the table 1).

TABLE 2

| IRDT*[1] | FA1*[2] . . . | FAn*[3] |
|---|---|---|
| 2021 Jan. 1 10:00:01 | 20 | 11 |
| 2021 Jan. 1 10:00:04 | 10 | 14 |
| . . . | . . . | . . . |
| 2021 May 24 21:05:30 | 65 | 20 |
| 2021 May 25 21:16:50 | 120 | 18 |
| 2021 May 25 21:16:53 | 139 | 13 |

*[1]"IRDT" is the image reading date/time.
*[2]"FA1" is the feature amount 1.
*[3]"FAn" is the feature amount n.

(Function of Collecting Extension Data)

The engine controller ECTL includes, as a functional block for collecting the extension data, an extension data collecting portion ECTL06 as an extension data collecting unit. The extension data collecting portion ECTL06 extracts image data (extension data), in a region designated from the image data, stored by the image analyzing portion ECTL03, and transmits the extension data to a communicating portion PCTL01 as a communicating unit included in the video controller PRO1. However, region designation is made by a collection level setting reflecting portion ECTL08 described later, and in the case where a designated region is "0 (none)", transmission processing of the extension data is not performed. Further, when the extension data is transmitted from the basic data collecting portion ECTL06, the communicating portion PCTL01 notifies the b controller server SCTL of the image reading gate/time and the image data. The image data (extension data) in the designated region is an example of data (operation history data) relating to an operation history of the image forming apparatus. The server controller SCTL causes the storage device 86 to store the image reading data/time and the image data. The extension data collecting portion ECTL06 may directly transmit the image reading date/time and the image data to the extension data analyzing portion SCTL02 of the server controller SCTL described later via the communicating portion PCTL01 included in the video controller PRO1. Incidentally, an example of the stored extension data is shown in table 3.

TABLE 3

| IRDT*[1] | PIXEL(1, 1) . . . | PIXEL(h, w) |
|---|---|---|
| 2021 Jan. 1 10:00:01 | 123 | 143 |
| 2021 Jan. 1 10:00:04 | 143 | 143 |
| . . . | . . . | . . . |
| 2021 May 24 21:05:30 | 185 | 185 |
| 2021 May 25 21:16:50 | 140 | 140 |
| 2021 May 25 21:16:53 | 139 | 139 |

*[1]"IRDT" is the image reading date/time.

(Function of Managing Collection Level)

The engine controller ECTL includes, as functional blocks for managing collection levels of the operation history data, a collection level setting receiving portion ETCL07 as a collection level receiving unit and a collection level setting reflecting portion ETCL08 as a collection level reflecting unit. The collection level setting receiving portion ETCL07 receives a collection level setting from a collection level setting transmitting position SCTL06 included in the server controller SCTL described later. The collection level setting, in this embodiment is that propriety of basic data collection and a region of extension data collection are instructed to the basic data collecting portion ECTL05 and the extension data collecting portion ECTL06, respectively, and are expressed as commands to the engine controller ECTL. In the case where the collection level setting receiving portion ECTL07 receives a command to instruct the collection level setting, the collection level setting reflecting portion ECTL08 sets (changes) the basic data collection level and the extension data collection level as shown in a table 4. As regards the collection level setting, "Level 1" is lowest in analysis accuracy, "Level 2" is higher in analysis accuracy than "Level 1", and "Level 3" is highest in analysis accuracy. On the other hand, there is a tendency that the collection level setting higher in analysis accuracy requires a more system resource and takes a higher operation cost.

TABLE 4

| CLS*[1] | CWDF*[2] | BDCVIV*[3] | EDCR*[4] |
|---|---|---|---|
| Level 1 | Type 1 | VALID | NONE |
| Level 2 | Type 2 | VALID | PARTIAL |
| Level 3 | Type 3 | INVALID | WHOLE |

*[1]"CLS" is the collection level setting.
*[2]"CWDF" is correspondence with the detection form in the table 1.
*[3]"BDCVIV" is basic data collection validity/invalidity.
*[4]"EDCR" is an extension data collection region.

(Function of Analyzing Image Defect from Basic Data)

The server controller SCTL includes, as a functional block for analyzing the image defect from the basic data, the basic data analyzing portion SCTL01 as a basic data analyzing unit. The basic data analyzing portion SCTL01 calculates an average Ai (i=1 to n) for the last X sheets with respect to the feature amount received from the basic data collecting portion ECTL05 (stored in the storage device 86). In this embodiment, X=100 is set, and in the case where the number of data is below X, the average Ai is not calculated. Further, the basic data analyzing portion SCTL01 calculates Vi=max(Ai)−min(Ai), and for Vmax=max(Vi), on the basis of a criterion shown in a table 5, the basic data analyzing portion SCTL01 analyzes the image defect due to the vertical stripe, and associates an analysis result with an image reading data/time and then stores the associated analysis result in the storage device 86.

TABLE 5

| AOFA*[1] | AR*[2] |
|---|---|
| NOT CALCULATED | UNCLEAR |
| <100 | GOOD |
| 100 ≤ and < 200 | NORMAL |
| 200≤ | ATTENTION |

*[1]"AOFA" is the average of feature amounts.
*[2]"AR" is the analysis result.

(Function of Analyzing Image Defect from Extension Data)

The server controller SCTL includes, as a functional block for analyzing the image defect from the extension data, the extension data analyzing portion SCTL02 as an extension data analyzing unit. The extension data analyzing portion SCTL02 calculates an average Aj (j=1 to w) for the last X sheets by calculating the feature amount for each pixel from image data received from the extension data collecting portion ECTL06 (stored in the storage device 86). In this embodiment, X=100 is set, and in the case where the number of data is below X, the average Aj is not calculated. Further, the extension data analyzing portion SCTL02 calculates Wj=max(Aj)−min(Aj), and for Wmax=max(Vj), on the basis of a criterion shown in a table 5, the extension data analyzing portion SCTL02 analyzes the image defect due to the vertical stripe, and associates an analysis result with an image reading data/time and then stores the associated analysis result in the storage device 86.

(Function of Determining Measure Content)

The server controller SCTL includes, as a functionable block for determining the measure content, the measure content determining portion SCTL03 as a measure content determining unit. The measure content determining portion SCTL03 determines the measure content on the basis of analysis results of the basic data analyzing portion SCTL01 and the extension data analyzing portion SCTL02. In this embodiment, an example of a unit in which the image defect occurs is the fixing device 30, and the measure content determining portion SCTL03 determines the measure content in accordance with a criterion shown in a table 6 below. The measure content determining portion SCTL03 notifies the monitoring tool MT of the determined measure content. As shown in the table 6, the measure content determining portion SCTL03 integrates the analysis result of the basic data analyzing portion SCTL01 with the analysis result of the extension data analyzing portion SCTL02. Then, the measure content determining portion SCTL03 notifies a command of "exchange recommendation of fixing device" in the case where discrimination of "attention" is made in either one of the analysis results, and notifies a command of "strong recommendation of exchange of fixing device" in the case where discrimination of "attention" is made in both of the analysis results.

TABLE 6

| BDAPAR*[1] | EDAPAR*[2] | MC*[3] |
|---|---|---|
| UNCLEAR/GOOD/NORMAL | UNCLEAR/GOOD/NORMAL | NONE |
| | ATTENTION | EROFD |
| ATTENTION | UNCLEAR/GOOD/NORMAL | EROFD |
| | ATTENTION | SROEOFD |

*[1]“BDAPAR” is the basic data analyzing portion analysis result.
*[2]“EDAPAR” is the extension data analyzing portion analysis result.
*[3]“MC” is the measure content. “EROFD” is exchange recommendation of the fixing device. “SROEOFD” is strong recommendation of exchange of the fixing device.

(Function of Transmitting Measure Content>

The server controller SCTL includes, as a functional block for transmitting the measure content, the measure content transmitting portion SCTL04 as a measure content transmitting unit (notifying unit). The measure content transmitting portion SCTL04 transmits the measure content, determined by the measure content determining portion SCTL03, to the measure content receiving portion MCTL01, included in the monitoring tool controller MCTL described later, via a network. The monitoring tool MT may cause a storage portion thereof to once store the measure content received from the server controller SCTL. In this embodiment, the above-described measure content is transmitted as a command to the monitoring tool MT as a notification client device.

(Function of Displaying Measure Content)

The monitoring tool controller MCTL includes, as functional blocks for displaying the measure content, the measure content receiving portion MCTL01 as a measure content receiving unit, the measure content reflecting portion MCTL02 as a measure content reflecting unit, and a display controller MCTL03 as a display control unit.

In this embodiment, on the basis of a state of the image defect, specifically the above-described analysis results of the basic data and the extension data, a display content of the operation display portion MDSP of the monitoring tool MT. The measure content receiving portion MCTL01 receives the measure content from the measure content transmitting portion SCTL04 included in the server controller SCTL (or acquires the measure content from the storing portion of the monitoring tool MT). In this embodiment, as the measure content, an instruction to a dealer, such as “exchange recommendation of fixing device” or “strong recommendation of exchange of fixing device” is displayed on the operation display portion MDSP of the monitoring tool MT.

In the case where the measure content receiving portion MCTL01 receives the command of the “exchange recommendation of fixing device”, the measure content reflecting portion MCTL02 provides an instruction to the display controller so as to display information indicating the “exchange recommendation of fixing device” as the measure content on the operation display portion MDSP. The display controller MCTL03 causes the operation display portion MDSP to display a message to the effect that the exchange of the fixing device 30 is simply recommended or display a preparation instruction such as an order of the fixing device 30 for exchange in addition thereto or in place thereof, or the like.

Further, in the case where the measure content receiving portion MCTL01 receives the command of the “strong recommendation of exchange of fixing device”, the measure content reflecting portion MCTL02 provides an instruction to the display controller so as to display information indicating the “strong recommendation of exchange of fixing device” as the measure content on the operation display portion MDSP. The display controller MCTL03 causes the operation display portion MDSP to display a message to the effect that the exchange of the fixing device 30 is simply strongly recommended or display an instruction such as an order of the fixing device 30 for exchange in addition thereto or in place thereof, or the like. By this, the dealer becomes capable of checking a necessary measure from the display of the operation display portion MDSP.

(Function of Determining Collection Level Setting)

The server controller SCTL includes, as a functional block for determining the collection level setting, the collection level setting determining portion SCTL05 as a collection level setting determining unit (collection data setting determining unit. The collection level setting determining portion SCTL05 determines the collection level setting on the basis of the analysis results of the basic data analyzing portion SCTL01 and the extension data analyzing portion SCTL02. In this embodiment, the collection level setting determining portion SCTL05 determines the collection level setting in accordance with a criterion shown in a table 7 below. As shown in the table 7, the collection level setting determining portion SCTL05 integrates the analysis result of the basic data analyzing portion SCTL01 with the analysis result of the basic data analyzing portion SCTL02. Then, the collection level setting determining portion SCTL05 increases the collection level setting depending on the number of times of discrimination of the “attention”.

TABLE 7

| BDAPAR*[1] | EDAPAR*[2] | CLS*[3] |
|---|---|---|
| UNCLEAR/GOOD/NORMAL | UNCLEAR/GOOD/NORMAL | LEVEL 1 |
| | ATTENTION | LEVEL 2 |
| NOTICE | UNCLEAR/GOOD/NORMAL | LEVEL 2 |
| | ATTENTION | LEVEL 3 |

*[1]“BDAPAR” is the basic data analyzing portion analysis result.
*[2]“EDAPAR” is the extension data analyzing portion analysis result.
*[3]“CLS” is the collection level setting.

(Function of Transmitting Collection Level Setting)

The server controller SCTL includes, as a functional block for transmitting the collection level setting, the collection level setting transmitting portion SCTL06 as a collection level setting transmitting unit. The collection level setting transmitting portion SCTL06 transmits the collection level setting determined by the collection level setting determining portion SCTL05 to the collection level setting receiving portion ECTL07 included in the engine controller ECTL via the communicating portion PCTL01 included in the video controller PR01.

Thus, the collection level setting determining portion SCTL05 of the server SV notifies the printer PR of the collection level setting, determined on the basis of the analysis results of the basic data and the extension data, via the collection level setting transmitting portion SCTL06. By this, the basic data collecting portion ECTL05 and the extension data collecting portion ECTL06 of the printer PR change the collection level setting which is a setting relating to data collection via the collection level setting receiving portion ECTL07 and the collection level setting reflecting portion ECTL08. Then, the basic data collecting portion ECTL05 and the extension data collecting portion ECTL06 collect the operation history data on the basis of this collection level setting, and transmit the collected operation history data to the server SV.

<Operations of Controllers: FIG. 6>

Operations of the engine controller ECTL, the server controller SCTL, and the monitoring tool controller MCTL in this embodiment will be described using FIG. 6. FIG. 6 is a flowchart for explaining the operations of the engine controller ECTL, the server controller SCTL, and the monitoring tool controller MCTL in this embodiment.

A procedure of the flowchart of FIG. 6 is started when the engine controller ECTL (printer engine PR03) receives a print instruction. When the engine controller ECTL receives the print instruction, the engine controller ECTL controls the respective devices the printer PR so as to form the image on the first surface of the recording material S by the above-described image forming process (S001). Next, the engine controller ECTL conveys the first recording material S1 toward the double-side conveying path 52 by providing an instruction to the double-side flapper 55 so as to guide the first recording material S in a direction toward the reversing roller pair 50 (S002). Next, the engine controller ECTL executes image reading with the CIS93 when the leading end of the recording material S1 with respect to the conveying direction reaches the image reading portion 90 (S003). Next, the engine controller ECTL causes the RAM82 to store the read image data and the calculated feature amount in the image analyzing portion ECTL03 (S004). Thereafter, in the basic data collecting portion ECTL05 and the extension data collecting portion ECTL06, depending on the collection level setting (S005), the engine controller ECTL notifies the server controller SCTL of at least one of the feature amount and the image data (S006L1, S006L2, S006L3). That is, in the case where the collection level setting is Level 1, the basic data collecting portion ECTL05 notifies the server controller SCTL of the feature amount (S006L1). Further, in the case where the collection level setting is Level 2, the basic data collecting portion ECTL05 notifies the server controller SCTL of the feature amount, and the extension data collecting portion ECTL06 notifies the server controller SCTL of the image data (S006L2). Further, in the case where the collection level setting is Level 3, the extension data collecting portion ECTL06 notifies the server controller SCTL of the image data (S006L3). Next, in the basic data analyzing portion SCTL01 and the extension data analyzing portion SCTL02, the server controller SCTL analyzes the image defect on the basis of the received feature amount and the received image data (S007).

That is, the basic data analyzing portion SCTL01 analyzes the image defect on the basis of the feature amount received from the basic data collecting portion ECTL05. Further, the extension data analyzing portion SCTL02 analyzes the image defect on the basis of the image data received from the extension data collecting portion ECTL06.

Next, the server controller SCTL determines the measure content on the basis of the analysis results of the basic data and the extension data in the measure content determining portion SCTL03, and transmits the measure content to the monitoring tool controller MCTL (S008). In this embodiment, the measure content determining portion SCTL03 determines the measure content in accordance with the criterion shown in the table 6. Next, the monitoring tool controller MCTL receives the measure content in the measure content receiving portion MCTL01. Then, in the measure content reflecting portion MCTL02, the monitoring tool controller MCTL reflects the received measure content in control of the operation display portion MDSP by the display controller MCTL03 (S009). In this embodiment, in accordance with the commands indicating the measure contents such as the "exchange recommendation of fixing device" and the "strong recommendation of exchange of fixing device", the display controller MCTL03 causes the operation display portion MDSP to display the instruction to the dealer.

Next, in the collection level setting determining portion SCTL05, the server controller SCTL determines the collection level setting on the basis of the analysis results of the basic data and the extension data, and transmits the collection level setting to the engine controller ECTL (S0101). In this embodiment, the collection level setting determining portion SCTL05 determines the collection level setting in accordance with the criterion shown in the table 7. Next, the engine controller ECTL receives the collection level setting in the collection level setting receiving portion ECTL07. Then, in the collection level setting reflecting portion ECTL08, the engine controller ECTL reflects the received collection level setting in collect (setting of propriety of the basic data collection, setting of a region of the extension data collection) by the basic data collecting portion ECTL05 and the extension data collecting portion ECTL06, respectively (S011).

Incidentally, for convenience of explanation, procedures of S008 to S009 and procedure of S010 to S011 are described in parallel, but these procedures may be executed in a reverse order and may also be executed substantially at the same time.

Next, the engine controller ECTL controls the respective devices of the printer PR so that the image is formed on the second surface of the recording material S by the above-described image forming process, and the recording material S is discharged to the outside of the image forming apparatus (S020).

Thereafter, the engine controller ECTL returns to the formation of the image on the first surface of the recording material S again (S001) when a print instruction for a subsequent recording material S is provided (S021), and ends the control when the print instruction is not provided.

Thus, in this embodiment, the image forming system 100 adjusts the collection level setting dynamically on the basis of the analysis result of the operation history data. Specifically, in this embodiment, on the basis of the analysis result of the basic data analyzing portion SCTL01 and the analysis result of the extension data analyzing portion SCTL02, the image forming system 100 dynamically adjusts a setting of propriety of the basic data collection of the basic data collecting portion ECTL01 and a setting of the region of the extension data collection of the extension data collecting portion ECTL02. By this, an operation cost can be optimized while flexibly coping with a change in analysis accuracy required depending on the operation history or the like.

Embodiment 2

Next, another embodiment of the present invention will be described. Basic constitutions and operations of an image forming system and an image forming system and an image forming apparatus of this embodiment are the same as those of the image forming system and the image forming apparatus in the embodiment 1. Accordingly, in the image forming system and the image forming apparatus in this embodiment, elements having functions or constitutions identical or corresponding to those in the embodiment 1 will be omitted from detailed description by adding thereto reference numerals or symbols which are the same as those in the embodiment 1.

In this embodiment, the image forming system 100 determines the collection level setting on the basis of the analysis result of the operation history data and a contract plan as information designating an adjusting pattern of the collection level (collection level setting) of the operation history data.

<Function Blocks: FIG. 7>

FIG. 7 is a schematic view showing the functionable blocks of the engine controller ECTL, the server controller SCTL, and the monitoring tool controller MCTL. In this embodiment, this embodiment is different from the embodiment 1 in that the image forming system 100 determines the collection level setting by principally using a contract plan setting portion MCTL04.

In this embodiment, the monitoring tool controller MCTL includes, as a functional block for acquiring information designating the adjusting pattern, the contract plan setting portion MCTL04 as a contract plan setting unit (adjusting pattern designating unit). The contract plan setting portion MCTL04 constitutes a maintenance set information collecting portion MCTL06 as a maintenance set information collecting unit. The adjusting pattern of the collection level setting is information indicating a relationship between the analysis result of the operation history data and the collection level setting. In other words, the adjusting pattern of the collection level setting is information indicating a rule for adjusting the collection level setting depending on the analysis result of the operation history data. In the embodiment 1, in the image forming system 100, only one kind of the adjusting pattern of the collection level setting is provided, but in this embodiment, a plurality of adjusting patterns of the collection level settings are provided and are used selectively depending on the contract plan.

In this embodiment, in the contract plan setting portion MCTL04 (storing portion of the monitoring tool MT), as information designating the collection level setting adjusting pattern, contract plan information indicating a contract plan (contract content) concluded between the dealer and a user is stored. The contract plan information is an example of the maintenance set information which is information on a preset condition about maintenance of the image forming apparatus. The contract plan information stored in the contract plan setting portion MCTL04 is transmitted to the collection level setting determining portion SCTL05 via the network. Further, in this embodiment, in the collection level setting determining portion (the storage device 86 of the server controller SCTL), the collection level setting adjusting pattern for each contract plan is stored. Then, in this embodiment, the collection level setting determining portion SCTL05 discriminates (determines) the collection level setting by using the analysis results of the basic data and the extension data and in addition, the collection level setting adjusting pattern selected depending on the contract plan information.

The collection level settings in this embodiment are similar to those shown in the table 4 in the embodiment 1.

That is, as regards the collection level setting, "Level 1" is lowest in analysis accuracy, "Level 2" is higher in analysis accuracy than "Level 1", and "Level 3" is highest in analysis accuracy. On the other hand, the collection level setting with higher analysis accuracy uses more system resource and has a tendency that it takes much operation cost. For that reason, typically, as regards an adjusting pattern such that the collection level setting with higher analysis accuracy is more frequently used, the dealer concludes a more expensive contract plan with the user, and provides the user with service.

In a table 8 below, analysis results of the basic data and the extension data and collection level setting adjusting patterns depending on contract plans are shown. A discrimination method of the collection level settings based on the analysis results (unclear, good, normal, attention) of the basic data and the extension data in this embodiment is similar to the discrimination method of the collection level settings in the embodiment 1. Further, in this embodiment, there are 5-stage contract plans from a contract plan A to a contract plan E, in which the contract plan A is a most inexpensive plan and the plan E.

TABLE 8

| | | P*[3]A | PB | PC | PD | PE |
|---|---|---|---|---|---|---|
| BRAPAR*[1] | EDAPAR*[2] | COLLECTION LEVEL SETTING | | | | |
| U/G/N | U/G/N | LEVEL1 | LEVEL1 | LEVEL1 | LEVEL2 | LEVEL3 |
| A | | LEVEL1 | LEVEL1 | LEVEL2 | LEVEL2 | LEVEL3 |
| A | U/G/N | LEVEL1 | LEVEL1 | LEVEL2 | LEVEL2 | LEVEL3 |
| A | | LEVEL1 | LEVEL2 | LEVEL3 | LEVEL3 | LEVEL3 |

*[1]"BDAPAR" is the basic data analyzing portion analysis result. "U" is unclear, "G" is good, "N" is normal, and "A" is attention.
*[2]"EDAPAR" is the extension data analyzing portion analysis result.
*[3]"P" is the plan (contract plan).

FIG. 8 shows an example of an operation screen for setting the contract plan in the contract plan setting portion MCTL04. The function of the monitoring tool MT is realized by, for example, that a personal computer executes software installed therein. For example, an operator is capable of inputting information in the monitoring tool MT by operating a UI (user interface) screen displayed on the operation screen MDSP with a keyboard, a mouse, or the like. In an example of FIG. 8, there is a check box in a column of each of the contract plans, and by selecting either one of the check boxes, it is possible to set an object collection level setting adjusting pattern to be applied in the printer PR of the user. FIG. 8 shows, as an example, a state in which the plan B.

Incidentally, in this embodiment, an example in which the monitoring tool MT is constituted by the personal computer was shown, but the monitoring tool MT may be, for example, a dedicated device including an operation screen.

Further, in the example of the table 8 (and FIG. 8), in the plan A and the plan E, the collection level setting is constant irrespective of the analysis result of the operation history data. Thus, in the plurality of adjusting patterns of preset collection level settings, and adjusting pattern in which the collection level setting is not dynamically adjusted on the basis of the analysis result of the operation history data may be included.

<Operations of Controllers: FIG. 9>

Operations of the engine controller ECTL, the server controller SCTL, and the monitoring tool controller MCTL in this embodiment will be described using FIG. 9. FIG. 9 is a flowchart for explaining the operations of the engine controller ECTL, the server controller SCTL, and the monitoring tool controller MCTL in this embodiment.

A procedure of a flowchart of part (a) of FIG. 9 is a procedure, for setting contract plan information, started in the monitoring tool controller MCTL (the monitoring tool MT) during installation of the printer PR, for example. Specifically, for example, on the basis of an operation in the monitoring tool MT by the operator who is dealer, the contract plan setting portion MCTL04 sets the contract plan information selected depending on the contract plan (contract content) concluded between the dealer and the user (S101).

A procedure of a flowchart of part (b) of FIG. 9 is a procedure, similar to the procedure of the flowchart of FIG. 6, started when the engine controller ECTL (the printer engine PR03) receives a print instruction. In the flowchart of part (b) of FIG. 9, processes identical or corresponding to those of the flowchart of FIG. 6 described in the embodiment 1 will be appropriately omitted from description by adding the same step numbers. This embodiment is different from the embodiment 1 in that a procedure (S102) in which the collection level setting determining portion SCTL05 acquires the contract plan information from the contract plan setting portion MCTL04 is added. Further, this embodiment is different from the embodiment 1 in that in a process of S007, analysis of the acquired contract plan information is performed.

Specifically, in the basic data analyzing portion SCTL01 and the extension data analyzing portion SCTL02, the server controller SCTL acquires a feature amount and image data from the basic data collecting portion ECTL05 and the extension data collecting portion ECTL06, respectively (S005, S006L1 to S006L3). Further, in the collection level setting determining portion SCTL05, the server controller SCTL acquires the contract plan information from the contract plan setting portion MCTL04 (S102). Next, similarly as in the embodiment 1, in the basic data analyzing portion SCTL01 and the extension data analyzing portion SCTL02, the server controller SCTL performs analysis of the image defect on the basis of the received feature amount and the received image data (S007). In addition, in the collection level setting determining portion SCTL05, the server controller SCTL analyzes the contract plan information acquired from the contract plan setting portion MCTL04, and discriminates (determines) the collection level setting adjusting pattern (S007).

Then, in the collection level setting determining portion SCTL05, the server controller SCTL determines the collection level setting on the basis of the analysis results of the basic data and the extension data, and the collection level setting selected depending on the contract plan information and transmits the collection level setting to the engine controller ECTL (S0101). In this embodiment, the collection level setting determining portion SCTL05 determines the collection level setting in accordance with the criterion shown in the table 8. Processes S008, S009, S020, and S021 are similar to those in the embodiment 1.

Incidentally, for convenience of explanation, procedures of S008 to S009 and procedure of S010 to S011 are described in parallel, but these procedures may be executed in a reverse order and may also be executed substantially at the same time.

Thus, in this embodiment, the collection level setting is adjusted dynamically on the basis of the analysis result of the operation history data and information (in this embodiment, condition preliminarily set by the contract plan information as maintenance set information) designating the collection level setting adjusting pattern. By this, an operation cost can be optimized in response to individual user's request while flexibly coping with a change in analysis accuracy required depending on the operation history or the like.

Incidentally, in this embodiment, the contract plan setting portion MCTL04 was provided in the monitoring tool MT, but is not limited thereto, and for example, may be provided in the engine controller ECTL. In this case, the contract plan information can be set from the operation display portion PR02 of the printer PR, not from the monitoring tool MT. Further, for example, the image forming system 100 acquires the contract plan information in the form of association with another cloud system (contrast system).

Embodiment 3

Next, another embodiment of the present invention will be described. Basic constitutions and operations of an image forming system and an image forming system and an image forming apparatus of this embodiment are the same as those of the image forming system and the image forming apparatuses in the embodiments 1 and 2. Accordingly, in the image forming system and the image forming apparatus in this embodiment, elements having functions or constitutions identical or corresponding to those in the embodiments 1 and 2 will be omitted from detailed description by adding thereto reference numerals or symbols which are the same as those in the embodiments 1 and 2.

In this embodiment, the image forming system 100 determines an appropriate notification client device on the basis of the analysis result of the operation history data and dispatch propriety information of a service person as information designating the notification client device which is a notification destination to which the measure content is notified. Further, in this embodiment, the image forming system 100 changes the measure content depending on the determined notification client device. In addition, in this embodiment, the collection level setting is changed depending on the determined notification client device.

<Function Blocks: FIG. 10>

FIG. 10 is a schematic view showing the functionable blocks of the engine controller ECTL, the server controller SCTL, and the monitoring tool controller MCTL. This embodiment is principally different from the embodiment 2 in the following three (first to third) points. The first point is such that the image forming system 100 acquires, as the maintenance set information, the dispatch propriety information of the service person as to whether or not the service person is capable of immediate dispatch, with use of a dispatch propriety information setting portion MCTL05. The second point is such that in the measure content determining portion (notification destination determining portion) SCTL03, the image forming system 100 receives and analyzes the contract plan information and the dispatch propriety information which are as the maintenance set information. The third point is such that in the collection level setting determining portion SCTL05, the image forming system 100 receives and analyzes the contract plan information and the dispatch propriety information which are as the maintenance set information.

In this embodiment, the monitoring tool controller MCTL includes, as a functional block for acquiring information designating the adjusting pattern, the contract plan setting portion MCTL04 as a contract plan setting unit. Further, in this embodiment, the monitoring tool controller MCTL includes, as the functional block for acquiring information designating the notification client device of the measure content, the dispatch propriety information setting portion MCTL05 as a dispatch propriety information setting unit (notification destination designating unit). The contract plan setting portion MCTL04 and the dispatch propriety information setting portion MCTL05 constitute the maintenance set information collecting portion MCTL06 as a maintenance set information collecting unit. Thus, in this embodiment, the maintenance set information collecting portion MCTL06 collects the contract plan information in the contract plan setting portion MCTL04, and in addition, collects the dispatch propriety information in the dispatch propriety information setting portion MCTL05. Each of the contract plan information and the dispatch propriety information is an example of the maintenance set information which is information on a preset condition about the maintenance of the image forming apparatus.

In this embodiment, the dispatch propriety information setting portion MCTL05 acquires information on a day of the week and a time zone which are as information on a dispatchable timing of the service person. For example, during the installation of the printer PR, the operator of the dealer sets, on the basis of an operation in the monitoring tool MT, information on the day of the week and the time zone when the service person is capable of being dispatched. FIG. 11 shows an example of an operation screen on which the day of the week and the time zone when the service person is capable of being dispatched. In the example of FIG. 11, there are check boxes for each day of the week, by selecting either of the check boxes, it is possible to set the dispatchable day(s) of the week of the service person to be applied to the printer PR of an objective user. Further, there are fields (boxes) for selecting time zone(s) for each day of the week, and by selecting either time zone(s) (for each (one) hour in the example of FIG. 11), it is possible to set the dispatchable time zone(s) of the service person to be applied to the printer PR of the objective user. In FIG. 11, a state in which a setting such that the service person is capable of being dispatched between AM10:00 and PM5:00 from Monday to Friday is made.

In the measure content determining portion SCTL03, the server controller SCTL determines a "maintenance state" on the basis of the dispatch propriety information (day of week, time zone) and a current date (day of week, time). In this embodiment, in the case where the current rate corresponds to the day of the week and the time zone when the service person is capable of being dispatched, the "maintenance state" is made "dispatchable". On the other hand, in the case where the current date does not correspond to the day of the week and the time zone when the service person is capable of being dispatched, the "maintenance state" is made "dispatch disablement".

Further, in this embodiment, in the measure content determining portion SCTL03, the server controller SCTL determines the measure content and the notification client device on the basis of the analysis results of the basic data and the extension data, and the above-described maintenance state. Thus, in this embodiment, the measure content determining portion SCTL03 not only has a function as a measure content determining unit but also has a function of a notification destination determining unit. In this embodiment, the measure content determining portion SCTL03 determines the measure content and the notification client device in accordance with a criterion shown in a table 9 appearing hereinafter. In the case where the maintenance state is the "dispatchable", the server controller SCTL transmits to the monitoring tool MT, a command of "exchange recommendation of fixing device" or "strong recommendation of exchange of fixing device" depending on an image defect state, specifically, the analysis results of the basic data and the extension data described in the embodiments 1 and 2. That is, in this case, the command indicating the measure content is transmitted to the monitoring tool MT as the notification client device. On the other hand, in the case where the "maintenance state" is "dispatch disablement", the server controller SCTL transmits, to the printer PR, a fixing device cleaning operation guidance display command depending on the image defect state, specifically the analysis results of the basic data and the extension data described in the embodiments 1 and 2. That is, in this case, the command indicating the measure content is transmitted to the printer PR as the notification client device.

In this embodiment, in the case of the "dispatchable", the server controller SCTL transmits the measure content to the measure content receiving portion MCTL01 included in the monitoring tool controller MCTL via the network similarly as in the embodiments 1 and 2. On the other hand, in this embodiment, in the case of "dispatch disablement", the server controller SCTL transmits the measure content to the engine controller ECTL by the measure content transmitting portion SCTL04. That is, in this case, the measure content transmitting portion SCTL04 transmits the measure content to a measure content receiving portion ECTL09 as a measure content receiving unit included in the engine controller ECTL via the communicating portion PCTL01 included in the video controller PRO1. The measure content receiving portion ECTL09 transmits the received measure content to a measure content reflecting portion ECTL10 as a measure content reflecting unit included in the engine controller ECTL. On the basis of the received measure content, the measure content reflecting portion ECTL10 carries out control so as to notify the user of the measure content by causing the operation display portion PRO2 of the printer PR to display the measure content.

As the measure content in the case of the "dispatch disablement", for example, it is possible to cite that a step for eliminating or reducing the image defect is executed typically on the basis of an operation by the user. Specifically, for example, in the display of the measure content, execution of a cleaning operation (cleaning mode) of the fixing device 30 preliminarily provided in the printer PR can be prompted to the user. In this case, for example, the measure content reflecting portion ECTL10 transmits, to the operation display portion PR02, a command for displaying a guidance for executing the cleaning operation of the fixing device 30 on the operation display portion PRO2.

As a specific method of the cleaning operation of the fixing device 30, it is possible to cite a method such that images (solid black image) high in image print ratio (image ratio) are formed on double (both) surfaces (sides) of the recording material S through double-side printing.

By this, even in a situation such that the service person cannot be immediately dispatched due to circumstances such as the day(s) of the week and the time zone(s) when the service person cannot be dispatched or due to other circumstances, an image defect occurrence level can be alleviated. Further, by this, it is possible to expect that a possibility that service dispatch is requested is suppressed.

Incidentally, in this embodiment, as the method of cleaning the fixing device 30, a method with the operation by the user is cited as an example, but the image defect is eliminated or reduced by another method without the operation by the user. Specifically, it is possible to cite, as an example, that the engine controller ECTL performs fine adjustment of the image density so that the image defect becomes in conspicuous.

TABLE 9

| S*[1] | | MC*[4] | NCD*[5] |
|---|---|---|---|
| M BRAPAR*[2] | EDAPAR*[3] | (C) | (CTD) |
| U/G/N | U/G/N | NONE | NONE |
| D | A | ROFDE | MT |
| A | U/G/N | ROFDE | MT |
| A | | SROFDE | MT |
| U/G/N | U/G/N | NONE | NONE |
| DD | A | FDCOGD | PR |
| A | U/G/N | FDCOGD | PR |
| A | | FDCOGD | PR |

*[1]"S" is the state. "M" is the "maintenance state". "D" is the "dispatchable" state. "DD" is the "dispatch disablement" state.
*[2]"BDAPAR" is the basic data analyzing portion analysis result.
*[3]"EDAPAR" is the extension data analyzing portion analysis result.
*[4]"MC" is the measure content. "C" is the command. "ROFDE" is recommendation of fixing device exchange. "SROFDE" is strong recommendation of fixing device exchange. "FDCOGD" is fixing device cleaning operation guidance display.
*[5]"NCD" is the notification client device. "MT" is the monitoring tool. "PR" is the printer.

Further, in this embodiment, in the collection level setting determining portion SCTL05, the server controller SCTL changes the collection level setting depending on the notification client device to which the measure content is notified. In this embodiment, in the case where the maintenance state is the "dispatchable" state and the measure content is transmitted to the monitoring tool, the collection level setting determining portion SCTL05 determines the collection level setting in accordance with the criterion shown in the table 8 similarly as in the embodiment 2. On the other hand, in this embodiment, the maintenance state is the "dispatch disablement" state, and in the case where the measure instruction is transmitted to the printer PR, the collection level setting is determined in accordance with a criterion shown in the table 10. In the collection level setting shown in the table 10, compared with the collection level setting shown in the table 8, values of a part of collection levels are set high. By this, when the measure is autonomously executed by the image forming system with use of data acquired by the detecting unit provided in the printer PR, data with high accuracy can be acquired, so that discrimination accuracy by the analyzing unit can be enhanced. Further, when the analysis accuracy is enhanced, in the case where there is a tendency that a discrimination result of the image defect state is improved, it is also possible to expect that a possibility of request of the service dispatch can be suppressed.

TABLE 10

| P*[3]A PB PC PD PE |
|---|
| BRAPAR*[1] EDAPAR*[2] CLS |
| U/G/N U/G/N LEVEL1 LEVEL1 LEVEL1 LEVEL2 LEVEL3 |
| A LEVEL1 LEVEL2 LEVEL3 LEVEL3 LEVEL3 |
| A U/G/N LEVEL1 LEVEL2 LEVEL3 LEVEL3 LEVEL3 |
| A LEVEL3 LEVEL3 LEVEL3 LEVEL3 LEVEL3 |

*[1]"BDAPAR" is the basic data analyzing portion analysis result. "U" is unclear, "G" is good, "N" is normal, and "A" is attention.
*[2]"EDAPAR" is the extension data analyzing portion analysis result.
*[3]"P" is the plan (contract plan). "CLS" is the collection level setting when the measure is instructed to the printer.

<Operations of Controllers: FIG. 12>

Operations of the engine controller ECTL, the server controller SCTL, and the monitoring tool controller MCTL in this embodiment will be described using FIG. 12. FIG. 12 is a flowchart for explaining the operations of the engine controller ECTL, the server controller SCTL, and the monitoring tool controller MCTL in this embodiment.

A procedure of a flowchart of part (a) of FIG. 12 is a procedure, for setting maintenance set information (contract plan information, dispatch propriety information) started in the monitoring tool controller MCTL (the monitoring tool MT) during installation of the printer PR, for example. Specifically, for example, on the basis of an operation in the monitoring tool MT by the operator who is dealer, the contract plan, and in addition, the dispatch propriety information setting portion MCTL05 sets the dispatch propriety (S201).

A procedure of a flowchart of part (b) of FIG. 12 is a procedure, similar to the procedure of the flowchart of FIG. 6 and part (b) of FIG. 9, started when the engine controller ECTL (the printer engine PR03) receives a print instruction. In the flowchart of part (b) of FIG. 12, processes identical or corresponding to those of the flowchart of FIG. 6 and part (b) of FIG. 9 described in the embodiments 1 and 2, respectively, will be appropriately omitted from description by adding the same step numbers. This embodiment is different from the embodiments 1 and 2 in that a procedure (S202) in which the measure content determining portion SCTL03 and the collection level setting determining portion SCTL05 acquire the maintenance set information (contract plan information, dispatch propriety information) from the contract plan setting portion MCTL04 is added. Further, this embodiment is different from the embodiments 1 and 2 in that in a process of S007, analysis of the acquired maintenance set information (contract plan information, dispatch propriety information) is performed. Further, in this embodiment, this embodiment is different from the embodiments 1 and 2 in that a procedure (S203) in which the measure content (notification destination) determining portion SCTL03 determines the notification client device on the basis of the dispatch propriety information. Further, this embodiment is different from the embodiments 1 and 2 in procedures (S008P, S008P, S008M, S009M) for determining and transmitting the measure content depending on the notification client device. Further, this embodiment is different from the embodiments 1 and 2 in that in the process of S010, the collection level setting is determined depending on the notification client device.

Specifically, in the basic data analyzing portion SCTL01 and the extension data analyzing portion SCTL02, the server controller SCTL acquires a feature amount and image data from the basic data collecting portion ECTL05 and the extension data collecting portion ECTL06, respectively (S005, S006L1 to S006L3). Further, in the measure content determining portion 8CTL03 and the collection level setting determining portion SCTL05, the server controller SCTL acquires the contract plan information and the dispatch propriety information from the contract plan setting portion MCTL04 and the dispatch propriety setting portion MCTL05 (S202). Next, similarly as in the embodiments 1 and 2, in the basic data analyzing portion SCTL01 and the extension data analyzing portion SCTL02, the server controller SCTL performs analysis of the image defect on the basis of the received feature amount and the received image data (S007). Further, in the measure content determining portion SCTL03, the server controller SCTL analyzes the dispatch propriety information acquired from the dispatch propriety information setting portion MCTL05 and then discriminates (determines) the maintenance state (S007). In addition, in the collection level setting determining portion SCTL05, the server controller SCTL analyzes the contract plan information acquired from the contract plan setting portion MCTL04, and discriminates (determines) the collection level setting adjusting pattern (S007).

Further, in the measure content (notification destination) determining portion SCTL03, the server controller SCTL selects (determines) as to whether the notification client device is the printer PR or the monitoring tool MT, depending on the maintenance state which is the analysis result of the dispatch propriety information (S203). In the case where the maintenance state is the "dispatchable" state, the measure content determining portion SCTL03 selects the monitoring tool MT as the notification client device which is the notification destination to which the measure content is notified. Then, in the measure content transmitting portion SCTL04, the server controller SCTL notifies the monitoring tool MT of an instruction of the measure to be executed as the measure content by the service person (S008M). By this, the monitoring tool MT receives the measure content in the measure content receiving portion MCTL01 (S009M). Further, in the measure content reflecting portion MCTL02 and the display controller MCTL03, the monitoring tool MT performs the processing so that the measure content is displayed on the operation display portion MDSP of the monitoring tool MT similarly as in the embodiments 1 and 2 (S009M). On the other hand, in the case where the maintenance state is the "dispatch disablement" state, the measure content determining portion SCTL03 selects the printer PR as the notification client device which is the notification destination to which the measure content is notified. Then, in the measure content transmitting portion SCTL04, the server controller SCTL notifies the printer PR of an instruction of the measure to be executed as the measure content by the user (S008P). By this, the printer PR receives the measure content in the measure content receiving portion ECTL09 (S009P). Further, in the measure content reflecting portion ECTL10, the printer PR performs the processing so that the measure content is displayed on the operation display portion PR02 of the printer PR (S009M). In this case, the measure content reflecting portion ECTL10 carries out control so as to cause the operation display portion PRO2 to display, for example, a guidance for the user to execute a cleaning operation method of the fixing device 30. In this embodiment, the measure content determining portion SCTL03 determines the measure content and the notification client device in accordance with the criterion shown in the table 0.

Further, in the collection level setting determining portion SCTL05, the server controller SCTL determines the collection level setting on the basis of the maintenance state (notification client device), the analysis results of the basic data and the extension data, and the contract plan information (S010). In this embodiment, in the case where the maintenance state is the "dispatchable" state and the notification client device is the monitoring tool MT, the collection level setting determining portion SCTL05 determines the collection level setting in accordance with the criterion shown in the table 8 similarly as in the embodiment 2. Further, in this embodiment, in the case where the maintenance state is the "dispatch disablement" state and the notification client device is the printer PR, the collection level setting determining portion SCTL05 determines the collection level setting in accordance with the criterion shown in the table 10. Processes S011, S012, S020, and S021 are similar to those in the embodiment 2.

Incidentally, for convenience of explanation, procedures of S203 to S009P or S009M and procedure of S010 to S011 are described in parallel, but these procedures may be executed in a reverse order and may also be executed substantially at the same time.

Thus, in this embodiment, on the basis of the analysis result of the operation history data and information (in this embodiment, the condition preliminarily set by the dispatch propriety information as the maintenance set information) designating the measure content notification client device, the measure content and the notification client device are determined. That is, in this embodiment, in consideration of a schedule of the service person, it is possible to determine an appropriate measure content and an appropriate notification client device. By this, even in a situation in which the service person cannot be dispatched, a step for eliminating or reduce the image defect can be performed by the user himself (herself).

Further, the possibility of the request of the service dispatch can be suppressed, so that it is also possible to expect that a service cost of the dealer is suppressed. At that time, in the case where the measure is taken in the situation in which the service person cannot be dispatched, the collection level of the operation history data is increased, so that discrimination accuracy can be enhanced.

Incidentally, in this embodiment, an example in which the day of the week and the time zone when the service person is dispatchable were fixedly set was described, but a dispatch propriety state of the service person may be updated in real time by interaction (communication) between the server and the monitoring tool.

Further, in this embodiment, the contract plan setting portion MCTL04 and the dispatch propriety information setting portion MCTL05 were provided in the monitoring tool MT, but is not limited thereto, and for example, may be provided in the engine controller ECTL. In this case, the contract plan information and operation propriety information can be set from the operation display portion PRO2 of the printer PR, not from the monitoring tool MT. Further, for example, the image forming system 100 acquires the contract plan information and the operation propriety information in the form of association with another cloud system (contrast system).

Other Embodiments

As described above, the present invention was described based on specific embodiments, but the present invention is not limited to the above-described embodiments.

In the above-described embodiments, the collection level setting was determined depending on the analysis result of the image defect, but the collection level setting may be determined depending on an analysis result of improper sheet feeding such as a jam rate or may also be determined depending on an analysis result of a state of an exchange component such as the fixing device or an intermediary transfer member. The jam rate is acquired from, for example, an occurrence rate of a jam (paper jam, early arrival, delay, or the like) in printing of a predetermined number of printed sheets. The state of the exchange component can be discriminated from, for example, a cumulative use amount (a drive time such as a rotation time, the number of times of drive such as the number of rotations) of the exchange component. Further, specific contents of the collection level setting are not limited to those described in the above-described embodiments, but other parameters such as a data collection frequency and a data length acquired once may be adjusted. Further, determination of the collection level setting in view of a plurality of analysis results may be performed.

Further, in the above-described embodiments, notification was described as being performed by display, but is not limited thereto. Notification by voice or notification by light emission may be employed.

Further, in the above-described embodiments, the image reading portion was provided in the double-side conveying path, but the image reading portion may be provided so as to read the image also in the case of one-side printing.

Further, the image forming apparatus is not limited to the image forming apparatus of the electrophotographic type but may be an image forming apparatus of another image forming type, for example, an ink jet type.

Further, the notification described as being performed in the printer in the above-described embodiments may be performed in a display portion or the like of a host computer such as a personal computer. Similarly, input of the information described as being made in the printer in the above-described embodiments may be made in an operating portion of the host computer such as the personal computer.

Further, the image forming system may also be such that a plurality of printers are communicatably connected to the server or the monitoring tool MT. In this case, information processing in the server or the monitoring tool MT is performed in association with discrimination (identification) information of the printers, so that for each of the printers, the control similar to the control in the above-described embodiments can be carried out. As regards the server and the monitoring tool, a plurality of servers and a plurality of monitoring tools may be provided.

That is, from the above-described embodiments, the following technical concept is derived.

According to an aspect of the present invention, an image forming system 100 including an image forming apparatus (printer) PR and a server apparatus (server) SV capable of communicating with the image forming apparatus PR is provided. The image forming apparatus PR collects the operation history data (basic data, extension data) relating to the operation history of the image forming apparatus PR on the basis of a collection data setting which is a setting relating to data collection, and is provided with a collecting unit (basic data collecting portion ECTL05, extension data collecting portion ECTL06) for transmitting the collected operation history data to the server apparatus SV. The server apparatus SV includes the analyzing unit (basic data analyzing portion SCTL01, extension data analyzing portion SCTL02) for analyzing the operation history data, and a collection data setting unit (collection level setting determining portion SCTL05) for providing notification to the image forming apparatus PR so as to change the collection data setting on the basis of the analysis results of the analyzing unit SCTL01 and SCTL02. Further, the operation history data includes information on acquisition timing (date and time or the like) of the operation history data and information on a state (degree of the image defect or the like) of the image forming apparatus at the acquisition timing. Further, a data amount of the operation history data each acquisition timing or per predetermined period is smaller in the above-described second collection data setting (for example, Level 2 or Level 3 of the collection level setting) than in the above-described third collection data setting (for example, Level 1 of the collection level setting).

Further, in an embodiment, the image forming apparatus PR includes the image reading unit (CIS93) capable of acquiring the image data from the recording material S subjected to the image formation in the image forming apparatus PR. Further, the collecting unit ECTL05 and ECTL06 collects and transmits, to the server apparatus SV in the case of the above-described first collection data setting, the data including the feature amount calculated on the basis of the above-described image data as the operation history data, and collects and transmits, to the server apparatus SV in the case of the above-described second collection data setting, the data including a part or all of the above-described image data as the operation history data. Further, the analyzing unit SCTL01 and SCTL02 acquires the analysis result showing the degree of the image defect on the basis of the above-described feature amount and the part or all of the above-described image data. For example, the collection data setting unit SCTL05 provides notification to the image forming apparatus PR so that the collection data setting is the above-described first collection data setting (for example, Level 1 of the collection level setting) in the case where the degree of the image defect shown by the above-described analysis result is a first degree, and provides notification to the image forming apparatus PR so that the collection data setting is the above-described second collection data setting (for example, Level 2 or Level 3 of the collection data setting) in the case where the degree of the image defect shown by the above-described analysis result is a second degree worse than the above-described first degree.

Further, in an embodiment, the image forming system 100 further includes the designating unit (contract plan setting portion MCTL04) for designating the change rule (collection level setting adjusting pattern) of the collection data setting to the collection data setting unit SCTL05. This designating unit may be provided in the information processing device (monitoring tool MT) communicatable with the server apparatus SV or may also be provided in the image forming apparatus PR. Further, this change rule may include information on the contract plan setting between the user of the image forming apparatus PR and the maintenance staff (dealer) of the image forming apparatus PR.

Further, in an embodiment, the server apparatus SV further includes the measure content determining unit (measure content determining portion SCTL03) for determining the measure content on the basis of the analysis results of the analyzing unit SCTL01 and SCTL02 and the notifying unit (measure content transmitting portion SCTL04) for notifying the notification client device of the measure content. Here, the measure content may include at least one of change of the elements (fixing device 30, intermediary transfer belt 11, sheet feeding roller 22, and the like) constituting the image forming apparatus PR, cleaning or adjustment of the elements (fixing device 30, intermediary transfer belt 11, sheet feeding roller 22, and the like) constituting the image forming apparatus, and a change (adjustment of the image density or the like) in operation setting relating to the image formation in the image forming apparatus PR. Further, the notification client device may be the information processing device (monitoring tool MT) communicatable with the server apparatus SV and may also be the image forming apparatus PR.

Further, in an embodiment, the server apparatus SV further includes the notification destination determining unit (measure content determining portion SCTL03 having a function of the notification destination determining portion) for changing the notification client device which is the notification destination of the measure content by the notifying unit SCTL04. For example, the notification destination determining unit SCTL03 is capable of changing the notification client device which is the notification destination of the measure content to the information processing device (monitoring tool MT) communicatable with the server apparatus SV and to the image forming apparatus PR. Further, in an embodiment, the image forming apparatus PR further includes the designating unit (dispatch propriety information setting portion MCTL05) for designating the change rule (dispatch propriety information) of the notification client device which is the notification destination of the measure content to the notification destination determining unit SCTL03. This designating unit may be provided in the information processing device (monitoring tool MT) communicatable with the server apparatus SV or in the image forming apparatus PR. Further, this change rule may include the information on the timings (day of week, time zone, and the like) when the maintenance staff (dealer) of the image forming apparatus PR is capable of performing the maintenance operation. Further, the measure content determining unit SCTL03 is capable of changing the measure content depending on the notification client which is the notification destination of the measure content. Further, the collection data setting unit SCTL05 is capable of providing notification to the image forming apparatus PR so as to change the collection data setting depending on the notification client device which is the notification destination of the measure content.

In other words, the image forming apparatus PR further includes the maintenance set information collecting unit (maintenance set information collecting portion MCTL06) for collecting the maintenance set information on the preset maintenance content of the image forming apparatus PR. Further, the notification destination determining unit MCTL03 is capable of changing the notification client device which is the notification destination of the measure content on the basis of the above-described maintenance set information, and the measure content determining unit SCTL03 is capable of changing the measure content on the basis of the above-described maintenance set information. Further, the collection data setting unit SCTL05 may provide notification to the image forming apparatus PR so as to change the collection data setting on the basis of the above-described maintenance set information. The maintenance set information collecting unit MCTL06 may be provided in the information processing device (monitoring tool MT) communicatable with the server apparatus SV or in the image forming apparatus PR.

Further, according to another aspect of the present invention, there is provided the image forming apparatus PR communicatable with the server apparatus SV. This image forming apparatus PR includes the collecting unit ECTL05 and ECTL06 which collect the operation history data relating to the operation history of the image forming apparatus PR on the basis of the collection data setting which is the setting about the data collection and which then transmit the collected operation history data to the server apparatus SV. In the collecting unit ECTL05 and ECTL06, the collection data setting is changed on the basis of notification received from the server apparatus SV by the image forming apparatus PR in response to transmission of the operation history data to the server apparatus SV by the collecting unit SCTL05 and SCTL06. In an embodiment, this collection data setting is changeable to the first collection data setting and the second collection data setting. Further, the operation history data includes information on the acquisition timing of the operation history data and information indicating a state of the image forming apparatus PR at the acquisition timing. Further, the data amount of the operation history data per each acquisition timing or the predetermined period is smaller in the above-described second collection data setting than in the above-described first collection data setting.

Further, according to another aspect of the present invention, there is provided the server apparatus SV communicatable with the image forming apparatus PR. This server apparatus SV includes the analyzing unit ECTL01 and ECTL02 which receive the operation history data relating to the operation history of the image forming apparatus PR collected in the image forming apparatus PR on the basis of the collection data setting which is the setting about the data collection and which then analyzes the received operation history data, and includes the collection data setting unit SCTL05 providing notification to the image forming apparatus PR so as to change the collection data setting on the basis of the analysis results of the analyzing unit SCTL01 and SCTL02. In an embodiment, this collection data setting is changeable to the first collection data setting and the second collection data setting. Further, the operation history data includes information on the acquisition timing of the operation history data and information indicating a state of the image forming apparatus PR at the acquisition timing. Further, the data amount of the operation history data per each acquisition timing or the predetermined period is smaller in the above-described second collection data setting than in the above-described first collection data setting.

According to the present invention, the collection level of the data relating to the operation history of the image forming apparatus, so that it becomes possible to efficiently obtain appropriate analysis accuracy depending on the operation history or the like of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-026048 filed on Feb. 22, 2024, which is hereby incorporated by reference herein in its entirety.

What is claimed is:

1. An image forming system comprising:

an image forming apparatus; and a server apparatus capable of communicating with the image forming apparatus, wherein the image forming apparatus includes a collecting unit configured to collect operation history data relating to an operation history of the image forming apparatus on the basis of a collection data setting which is a setting relating to collection of data and configured to transmit the collected operation history data to the server apparatus, and wherein the server apparatus includes an analyzing unit configured to analyze the operation history data and a collection data setting unit configured to provide notification to the image forming apparatus so that the collection data setting is changed on the basis of an analysis result of the analyzing unit, wherein the collection data setting is changeable to a first collection data setting and a second collection data setting, wherein the operation history data includes information on acquiring timings of the operation history data and information indicating a state of the image forming apparatus at each of the acquiring timings, and a data amount of the operation history data per each acquiring timing or per predetermined period is smaller in the first collection data setting than in the second collection data setting, wherein the image forming apparatus includes an image reading unit capable of acquiring image data from a recording material subjected to image formation in the image forming apparatus, wherein the collecting unit collects data including a feature amount calculated on the basis of the image data as the operation history data and transmits the data to the server apparatus, in a case of the first collection data setting, and collects data including a part or all of the image data as the operation history data and transmits the data to the server apparatus, in a case of the second collection data setting, and wherein the analyzing unit acquires the analysis result showing a degree of an image defect, on the basis of the feature amount and the part or all of the image data.

2. An image forming system according to claim 1, wherein the collection data setting unit provides notification to the image forming apparatus so that the collection data setting is changed to the first collection data setting in a case where the degree of the image defect shown by the analysis result is a first degree, and provides notification to the image forming apparatus so that the collection data setting is changed to the second collection data setting in a case where the degree of the image defect shown by the analysis result is a second degree worse than the first degree.

3. An image forming system according to claim 1, further comprising a designating unit configured to designate a change rule of the collection data setting for the collection data setting unit.

4. An image forming system according to claim 3, wherein the designating unit is provided in an information processing device capable of communicating with the server apparatus.

5. An image forming system according to claim 3, wherein the designating unit is provided in the image forming apparatus.

6. An image forming system according to claim 3, wherein the change rule includes information on a contract plan setting between a user of the image forming apparatus and a maintenance staff of the image forming apparatus.

7. An image forming system according to claim 1, wherein the server apparatus further comprises:

a measure content determining unit configured to determine a measure content on the basis of the analysis result of the analyzing unit; and a notifying unit configured to notify the measure content to a notification client device.

8. An image forming system according to claim 7, wherein the measure content includes at least one of exchange of an element constituting the image forming apparatus, cleaning or adjustment of the element constituting the image forming apparatus, and a change in operation setting relating to image formation in the image forming apparatus.

9. An image forming system according to claim 7, wherein the notification client device is an information processing device capable of communicating with the server apparatus.

10. An image forming system according to claim 7, wherein the notification client device is the image forming apparatus.

11. An image forming system comprising:

an image forming apparatus; and a server apparatus capable of communicating with the image forming apparatus, wherein the image forming apparatus includes a collecting unit configured to collect operation history data relating to an operation history of the image forming apparatus on the basis of a collection data setting which is a setting relating to collection of data and configured to transmit the collected operation history data to the server apparatus, and wherein the server apparatus includes an analyzing unit configured to analyze the operation history data and a collection data setting unit configured to provide notification to the image forming apparatus so that the collection data setting is changed on the basis of an analysis result of the analyzing unit, wherein the server apparatus further comprises:

a measure content determining unit configured to determine a measure content on the basis of the analysis result of the analyzing unit; and a notifying unit configured to notify the measure content to a notification client device, and wherein the server apparatus further comprises a notification destination determining unit configured to change the notification client device which is a notification destination of the measure content by the notifying unit.

12. An image forming system according to claim 11, wherein the notification destination determining unit is capable of changing the notification client device which is the notification destination of the measure content to an information processing device capable of communicating with the server apparatus and to the image forming apparatus.

13. An image forming system according to claim 11, further comprising a designating unit configured to designate a change rule of the notification client device, which is the notification destination of the measure content, for the notification destination determining unit.

14. An image forming system according to claim 13, wherein the designating unit is provided in an information processing device capable of communicating with the server apparatus.

15. An image forming system according to claim 13, wherein the designating unit is provided in the image forming apparatus.

16. An image forming system according to claim 13, wherein the change rule includes information on a timing when a maintenance staff of the image forming apparatus is capable of performing a maintenance operation.

17. An image forming system according to claim 11, wherein the measure content determining unit changes the measure content depending on the notification client device which is the notification destination of the measure content.

18. An image forming system according to claim 11, wherein the collection data setting unit provides notification to the image forming apparatus so that the collection data setting is changed depending on the notification client device which is the notification destination of the measure content.

19. A server apparatus capable of communicating with the image forming apparatus, comprising:

an analyzing unit configured to receive operation history data, relating to an operation history of the image forming apparatus, collected in the image forming apparatus on the basis of a collection data setting which is a setting relating to collection of data and configured to analyze the received operation history data; and a collection data setting unit configured to provide notification to the image forming apparatus so that the collection data setting is changed on the basis of an analysis result of the analyzing unit, wherein the collection data setting is changeable to a first collection data setting and a second collection data setting, wherein the operation history data includes information on acquiring timings of the operation history data and information indicating a state of the image forming apparatus at each of the acquiring timings, and a data amount of the operation history data per each acquiring timing or per predetermined period is smaller in the first collection data setting than in the second collection data setting, wherein as the operation history data, data including a feature amount calculated on the basis of image data acquired from a recording material subjected to image formation in the image forming apparatus is collected in a case of the first data setting, and a part or all of the image data is collected in a case of the second collection data setting, and wherein the analyzing unit acquires the analysis result showing a degree of an image defect, on the basis of the feature amount and the part or all of the image data.

* * * * *